(12) United States Patent
Son

(10) Patent No.: US 9,071,175 B2
(45) Date of Patent: Jun. 30, 2015

(54) ELECTRIC BICYCLE DRIVING APPARATUS

(71) Applicant: MANDO CORPORATION, Pyeongtaek-si (KR)

(72) Inventor: Hong Youp Son, Suwon-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 89 days.

(21) Appl. No.: 13/682,586

(22) Filed: Nov. 20, 2012

(65) Prior Publication Data

US 2014/0077743 A1 Mar. 20, 2014

(30) Foreign Application Priority Data

Sep. 19, 2012 (KR) .................. 10-2012-0104170

(51) Int. Cl.
*H02P 27/00* (2006.01)
*H02P 1/46* (2006.01)
*H02P 7/06* (2006.01)
(Continued)

(52) U.S. Cl.
CPC .. *H02P 7/06* (2013.01); *B62M 6/45* (2013.01); *B60L 11/007* (2013.01); *B60L 15/20* (2013.01); *B60L 15/2045* (2013.01); *Y02T 10/7283* (2013.01)

(58) Field of Classification Search
CPC ... H02P 21/0089; H02P 7/292; H02P 21/146; H02P 6/06; H02P 7/06
USPC ................. 318/494, 126, 119, 373, 369, 701; 701/22; 438/104, 151, 3, 460, 655, 10, 438/197; 388/809–815, 816–827, 828–830, 388/844, 853
See application file for complete search history.

(56) References Cited

U.S. PATENT DOCUMENTS 7,508,156 B2 * 3/2009 Mehlhorn ...................... 318/701
2003/0071589 A1 * 4/2003 Xi et al. ....................... 318/254

FOREIGN PATENT DOCUMENTS

EP          595452 A1 * 5/1994 .............. E05F 15/16
EP     0595452 B1 * 4/1997
(Continued)

OTHER PUBLICATIONS

Bork et al, Speed Match/Lost Grating Detection Apparatus, Feb. 1,1981; IP.com Electronic Publication ; Original Disclosure Information: TDB 02-81 p. 4011-4016.*
(Continued)

*Primary Examiner* — Bentsu Ro
*Assistant Examiner* — Zemenay Truneh
(74) *Attorney, Agent, or Firm* — McDermott Will & Emery LLP

(57) ABSTRACT

An electric bicycle driving apparatus is disclosed. The apparatus includes a speed change mode operator to output a first speed change mode signal or second speed change mode signal, a controller to receive the first speed change mode signal or second speed change mode signal and output a first control signal corresponding to the first speed change mode signal or a second control signal corresponding to the second speed change mode signal, a motor driver to, when the first speed change mode signal is output, receive the first control signal and output a first motor driving signal to drive a motor in a first speed change mode, and, when the second speed change mode signal is output, receive the second control signal and output a second motor driving signal to drive the motor in a second speed change mode, and a relay to selectively receive a relay switching enable signal.

7 Claims, 32 Drawing Sheets

(51) Int. Cl.
  *B62M 6/45* (2010.01)
  *B60L 11/00* (2006.01)
  *B60L 15/20* (2006.01)

(56) References Cited

FOREIGN PATENT DOCUMENTS

| JP | 2001008480 | A | * | 1/2001 | ............... | H02P 6/06 |
| JP | 2001-008480 | | * | 12/2001 | ............... | H02P 6/06 |
| JP | 2001008480 | | * | 12/2001 | ............... | H02P 6/06 |

OTHER PUBLICATIONS

Bork et al, Speed Match/Lost Grating Detection Apparatus, Feb. 1, 1981; IP.com Electronic Publication ; Original Disclosure Information: TDB 02-81 p. 4011-4016.*

* cited by examiner

ELECTRIC BICYCLE DRIVING APPARATUS

CROSS-REFERENCE TO RELATED APPLICATION

This application claims the benefit of Korean Patent Application No. 2012-0104170, filed on Sep. 19, 2012 in the Korean Intellectual Property Office, the disclosure of which is incorporated herein by reference.

BACKGROUND

1. Field

Embodiments of the present invention relate to an electric bicycle driving apparatus.

2. Description of the Related Art

In general, electric bicycle driving apparatuses are provided to drive electric bicycles.

Such a conventional electric bicycle driving apparatus reduces a speed change mode time by shortening a driving time of a motor driver when driving a motor of an electric bicycle in a high-speed mode or low-speed mode. To this end, the conventional electric bicycle driving apparatus includes a high-speed mode switching circuit and a low-speed mode switching circuit employing separate rectifying diodes and semiconductor switching devices.

However, in the conventional electric bicycle driving apparatus, heat may be generated from the rectifying diodes in a speed change mode. Furthermore, excessive heat generation may cause malfunction of the electric bicycle.

Also, in the conventional electric bicycle driving apparatus, because the high-speed mode switching circuit and low-speed mode switching circuit employing the rectifying diodes and semiconductor switching devices are driven in the speed change mode, the load to be driven may increase, resulting in a limitation in reducing consumption of battery power.

Moreover, in the conventional electric bicycle driving apparatus, because the high-speed mode switching circuit and low-speed mode switching circuit employing the rectifying diodes and semiconductor switching devices are driven in the speed change mode, there may be a limitation in suppressing an increase in cost of parts manufactured for the speed change mode.

SUMMARY

Therefore, it is an aspect of the present invention to provide an electric bicycle driving apparatus which may rapidly reduce a speed change mode time.

It is another aspect of the present invention to provide an electric bicycle driving apparatus which may reduce heat generation to prevent malfunction.

It is another aspect of the present invention to provide an electric bicycle driving apparatus which may reduce the load to be driven, so as to reduce consumption of battery power.

It is a further aspect of the present invention to provide an electric bicycle driving apparatus which may suppress an increase in cost of parts manufactured for a speed change mode.

Additional aspects of the invention will be set forth in part in the description which follows and, in part, will be obvious from the description, or may be learned by practice of the invention.

In accordance with an aspect of the present invention, an electric bicycle driving apparatus includes a speed change mode operator to output a first speed change mode signal or a second speed change mode signal, a controller to receive the first speed change mode signal or second speed change mode signal output from the speed change mode operator and output a first control signal corresponding to the first speed change mode signal or a second control signal corresponding to the second speed change mode signal, a motor driver to, when the speed change mode operator outputs the first speed change mode signal, receive the first control signal and output a first motor driving signal to drive a motor in a first speed change mode, and, when the speed change mode operator outputs the second speed change mode signal, receive the second control signal and output a second motor driving signal to drive the motor, the motor being rotating with a driving force of the first motor driving signal, in a second speed change mode, and a relay to selectively receive a relay switching enable signal from the controller, the relay being turned on in response to the relay switching enable signal to provide at least one of the first motor driving signal and second motor driving signal to the motor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
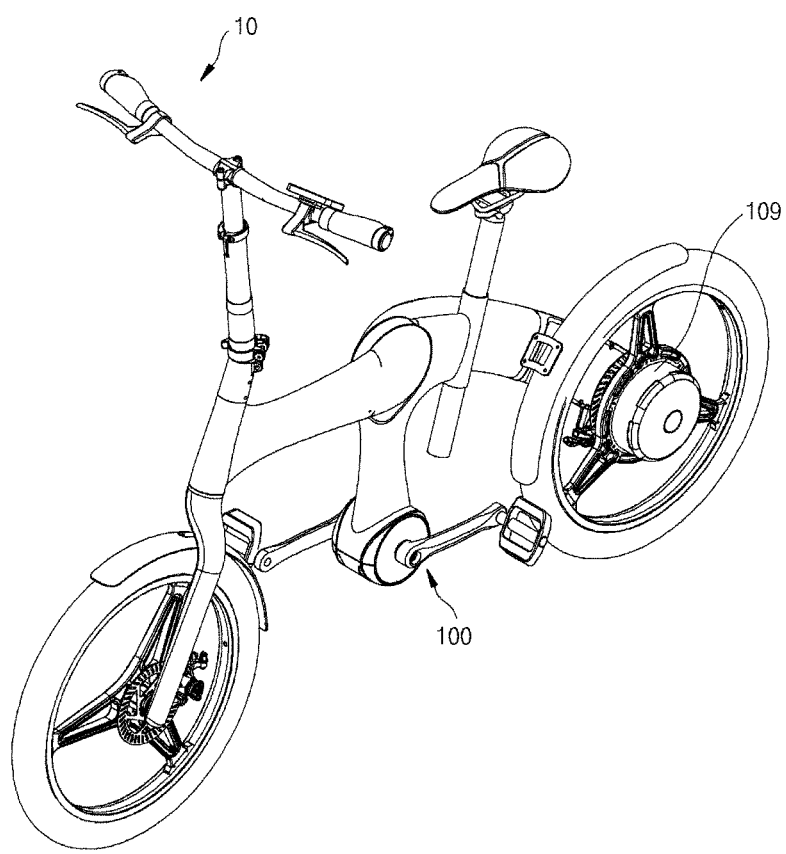
FIG. 1 is a perspective view of an electric bicycle including an electric bicycle driving apparatus according to a first embodiment of the present invention.

Reference will now be made in detail to the embodiments of the present invention, examples of which are illustrated in the accompanying drawings, wherein like reference numerals refer to like elements throughout.

<First Embodiment>

Figure 2:
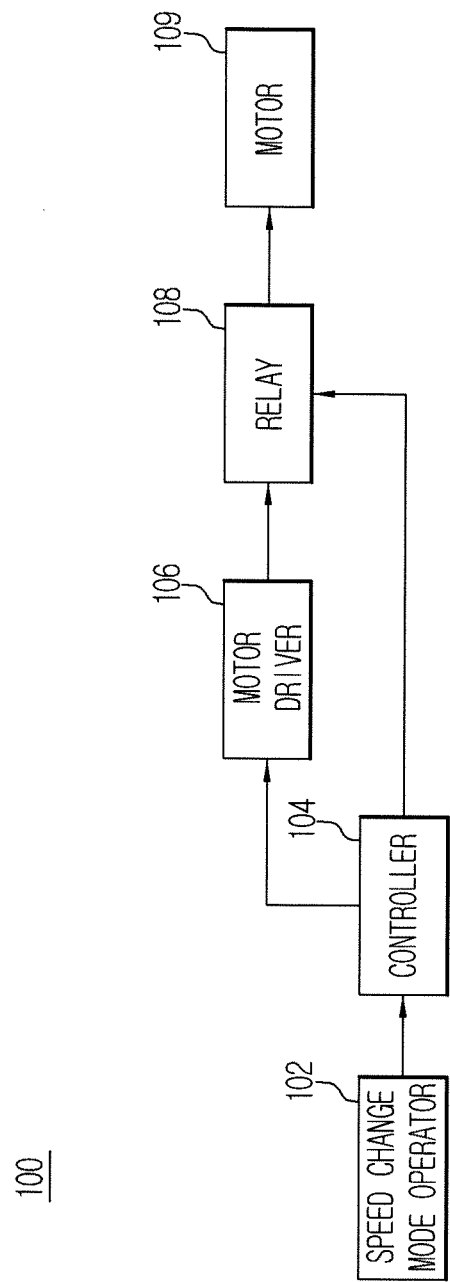
FIG. 2 is a block diagram showing the configuration of the electric bicycle driving apparatus according to the first embodiment of the present invention.

FIG. 1 is a perspective view of an electric bicycle including an electric bicycle driving apparatus according to a first embodiment of the present invention, and FIG. 2 is a block diagram showing the configuration of the electric bicycle driving apparatus according to the first embodiment of the present invention.

Figure 3:
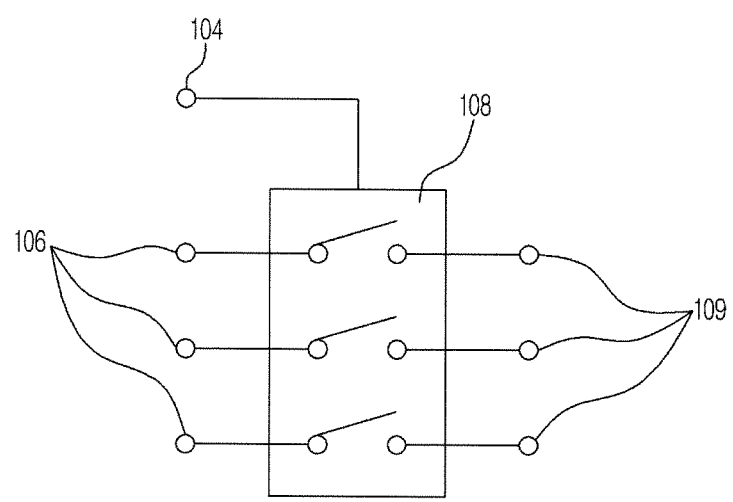
FIG. 3 is a view showing an embodiment of a relay in FIG. 2.
Figure 4:
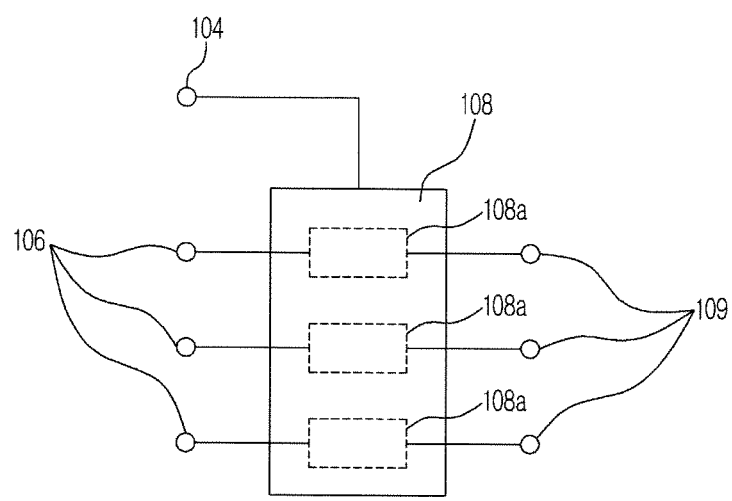
FIG. 4 is a view showing another embodiment of the relay in FIG. 2.

FIG. 3 is a view showing an embodiment of a relay in FIG. 2, and FIG. 4 is a view showing another embodiment of the relay in FIG. 2.

Figure 5:
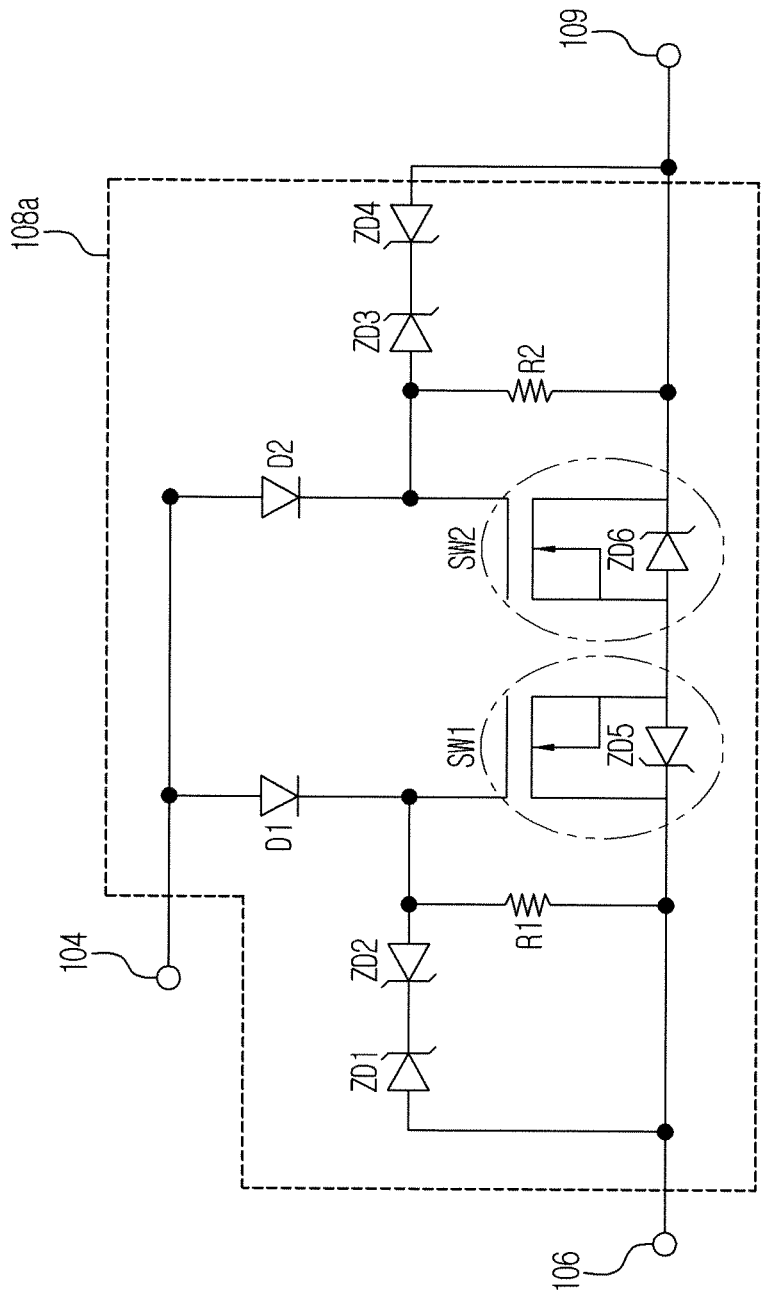
FIG. 5 is an equivalent circuit diagram showing an example of an internal configuration of the relay shown in FIG. 4.
Figure 6:
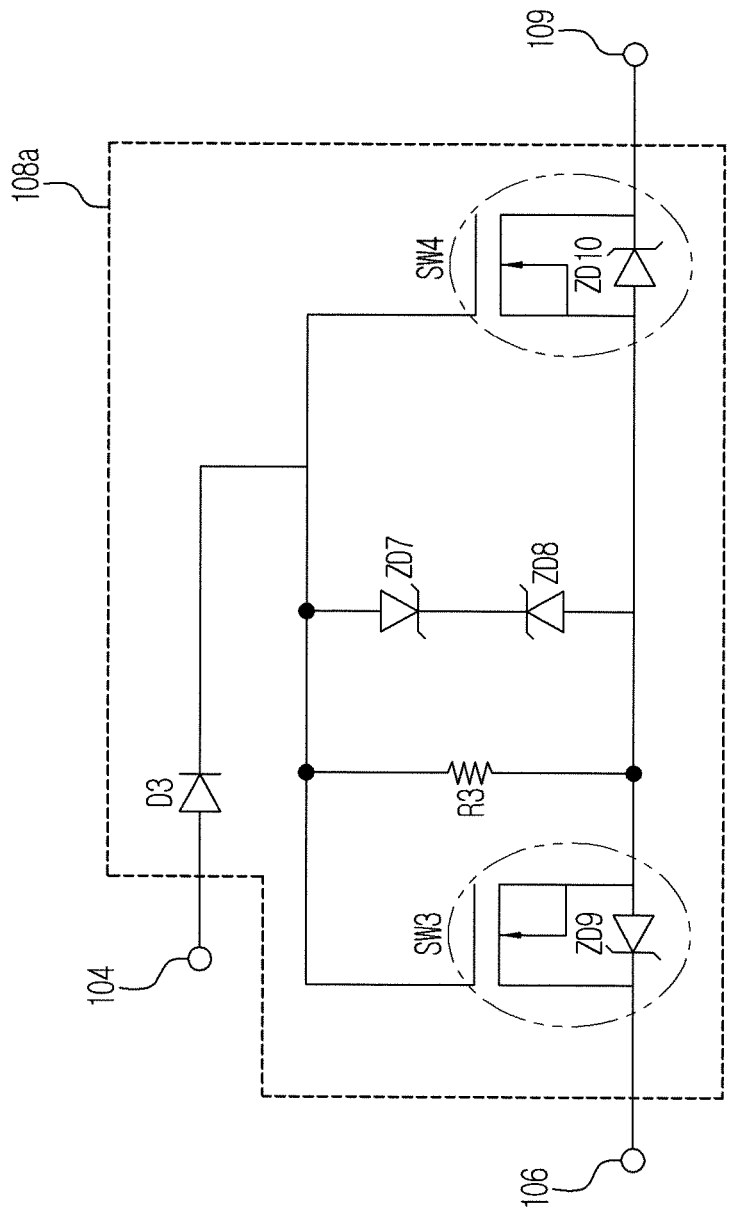
FIG. 6 is an equivalent circuit diagram showing another example of the internal configuration of the relay shown in FIG. 4.

FIG. 5 is an equivalent circuit diagram showing an example of an internal configuration of the relay shown in FIG. 4, and FIG. 6 is an equivalent circuit diagram showing another example of the internal configuration of the relay shown in FIG. 4.

First, referring to FIG. 1, the electric bicycle driving apparatus according to the first embodiment of the present invention, denoted by reference numeral 100, is provided at one side and the other side of the electric bicycle, denoted by reference numeral 10.

Next, referring to FIGS. 2 to 6, the electric bicycle driving apparatus 100 according to the first embodiment of the present invention includes a speed change mode operator 102, a controller 104, a motor driver 106, a relay 108, and a motor 109.

The speed change mode operator 102 is provided to output a first speed change mode signal or a second speed change mode signal.

The speed change mode operator 102 may be provided at a portion of a handlebar of the electric bicycle 10.

The controller 104 receives the first speed change mode signal or second speed change mode signal output from the speed change mode operator 102 and outputs a first control signal corresponding to the first speed change mode signal or a second control signal corresponding to the second speed change mode signal.

The controller 104 may include an electronic controller unit (ECU) or a micro controller unit (MCU).

When the speed change mode operator 102 outputs a low-speed mode signal corresponding to the first speed change mode signal, the motor driver 106 receives the first control signal and outputs a first motor driving signal to drive the motor 109 in a low-speed mode corresponding to a first speed change mode. Also, when the speed change mode operator 102 outputs a high-speed mode signal corresponding to the second speed change mode signal, the motor driver 106 receives the second control signal and outputs a second motor driving signal to drive the motor 109, which is rotating with a driving force of the first motor driving signal, in a high-speed mode corresponding to a second speed change mode.

On the other hand, when the speed change mode operator 102 outputs the high-speed mode signal corresponding to the first speed change mode signal, the motor driver 106 receives the first control signal and outputs the first motor driving signal to drive the motor 109 in the high-speed mode corresponding to the first speed change mode. Also, when the speed change mode operator 102 outputs the low-speed mode signal corresponding to the second speed change mode signal, the motor driver 106 receives the second control signal and outputs the second motor driving signal to drive the motor 109, which is rotating with the driving force of the first motor driving signal, in the low-speed mode corresponding to the second speed change mode.

The relay 108 selectively receives a relay switching enable signal from the controller 104 so as to be turned on in response to the relay switching enable signal. Upon being turned on, the relay 108 provides at least one of the first motor driving signal and second motor driving signal to the motor 109.

As shown in FIGS. 2 to 6, the relay 108 may be electrically connected between an output stage of the motor driver 106 and an input stage of the motor 109.

The relay 108 has an internal circuit 108a, which may include a first rectifying diode D1, a first switching device SW1, a first resistor R1, a second rectifying diode D2, a second switching device SW2, and a second resistor R2, as shown in FIGS. 4 and 5.

The first rectifying diode D1 may be electrically connected with one side of the controller 104, and the first switching device SW1 may be electrically connected with the first rectifying diode D1 and the motor driver 106.

Here, the first switching device SW1 may include at least one of a metal-oxide semiconductor field effect transistor (MOSFET) and a bipolar junction transistor (BJT).

In this case, the first switching device SW1 may further include at least one Zener diode ZD5 which is electrically connected with the first resistor R1, and the second switching device SW2 to be described later, to cut off an abnormal signal from the motor 109.

The first resistor R1 may be electrically connected with the first rectifying diode D1, the first switching device SW1 and the motor driver 106, and the second rectifying diode D2 may be electrically connected with the other side of the controller 104.

The second switching device SW2 may be electrically connected with the second rectifying diode D2, the first switching device SW1 and the motor 109, and the second resistor R2 may be electrically connected with the second rectifying diode D2, the second switching device SW2 and the motor 109.

Here, the second switching device SW2 may include at least one of a MOSFET and a BJT.

In this case, the second switching device SW2 may further include at least one Zener diode ZD6 which is electrically connected with the first switching device SW1 and the second resistor R2 to cut off an abnormal signal from the motor driver 106.

In the relay 108 with the above configuration, when the first and second switching devices SW1 and SW2 are turned on in response to the relay switching enable signal from the controller 104, rectified through the first and second rectifying diodes D1 and D2, the level of the first motor driving signal or second motor driving signal supplied from the motor driver 106 is adjusted by the first resistor R1 and in turn by the second resistor R2, and the first motor driving signal or second motor driving signal of the adjusted level is then supplied to the motor 109.

Also, the internal circuit 108a of the relay 108 may further include one or more Zener diodes ZD1 and ZD2 which are electrically connected with the motor driver 106 and the first resistor R1 to cut off an abnormal signal from the motor driver 106.

Also, the internal circuit 108a of the relay 108 may further include one or more Zener diodes ZD3 and ZD4 which are electrically connected with the second resistor R2 and the motor 109 to cut off an abnormal signal from the motor 109.

Alternatively, as shown in FIGS. 4 and 6, the internal circuit 108a of the relay 108 may include a third rectifying diode D3, a third switching device SW3, a third resistor R3, and a fourth switching device SW4.

The third rectifying diode D3 may be electrically connected with one side of the controller 104, and the third switching device SW3 may be electrically connected with the third rectifying diode D3 and the motor driver 106.

Here, the third switching device SW3 may include at least one of a MOSFET and a BJT.

In this case, the third switching device SW3 may further include at least one Zener diode ZD9 which is electrically connected with the motor driver 106 and the third resistor R3 to cut off an abnormal signal from the motor 109.

The third resistor R3 may be electrically connected with the third rectifying diode D3 and the third switching device SW3, and the fourth switching device SW4 may be electrically connected with the third rectifying diode D3, the third resistor R3 and the motor 109.

Here, the fourth switching device SW4 may include at least one of a MOSFET and a BJT.

In this case, the fourth switching device SW4 may further include at least one Zener diode ZD10 which is electrically connected with the third resistor R3 and the motor 109 to cut off an abnormal signal from the motor driver 106.

Also, the internal circuit 108a of the relay 108 may further include one or more Zener diodes ZD7 and ZD8 which are electrically connected with the third resistor R3, the third rectifying diode D3 and the fourth switching device SW4 to cut off an abnormal signal from at least one of the motor driver 106 and motor 109.

As stated above, the electric bicycle driving apparatus 100 according to the first embodiment of the present invention includes the speed change mode operator 102, the controller 104, the motor driver 106, the relay 108, and the motor 109.

Therefore, in the electric bicycle driving apparatus 100 according to the first embodiment of the present invention, when the first motor driving signal or second motor driving signal, output from the motor driver 106 for the speed change mode, is supplied to the motor 109, it may be possible to provide a faster switching response characteristic for a turn-on operation, thereby rapidly reducing a speed change mode time.

Further, in the electric bicycle driving apparatus 100 according to the first embodiment of the present invention, when the first motor driving signal or second motor driving signal, output from the motor driver 106 for the speed change mode, is supplied to the motor 109, it may be possible to reduce heat generation to prevent malfunction.

Moreover, in the electric bicycle driving apparatus 100 according to the first embodiment of the present invention, the unified relay 108 is employed, thereby making it possible to suppress an increase in cost of parts manufactured for the speed change mode.

<Second Embodiment>

Figure 7:
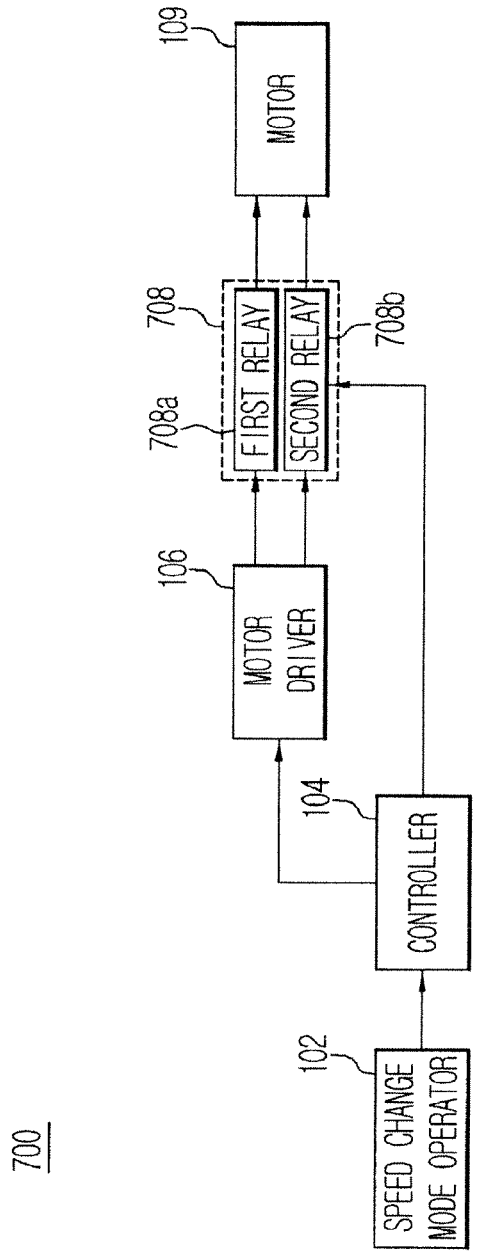
FIG. 7 is a block diagram showing the configuration of an electric bicycle driving apparatus according to a second embodiment of the present invention.
Figure 8:
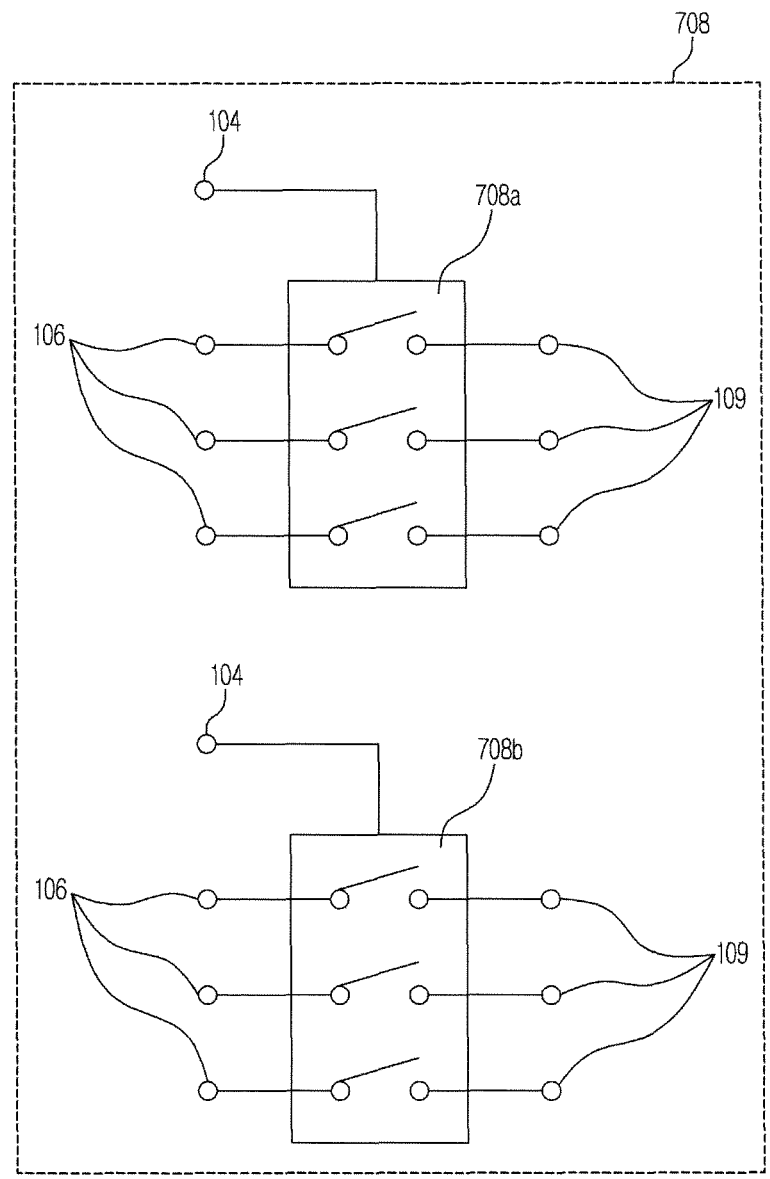
FIG. 8 is a view showing an embodiment of a relay in FIG. 7.
Figure 9:
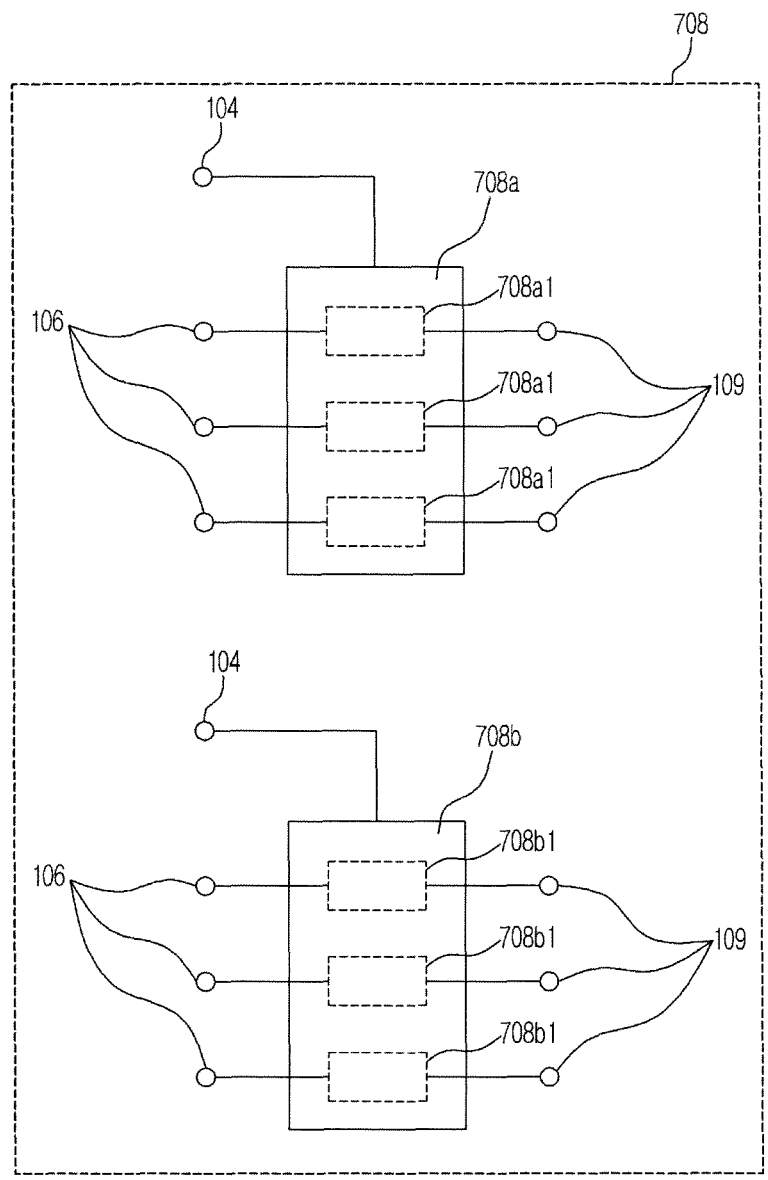
FIG. 9 is a view showing another embodiment of the relay in FIG. 7.

FIG. 7 is a block diagram showing the configuration of an electric bicycle driving apparatus according to a second embodiment of the present invention, FIG. 8 is a view showing an embodiment of a relay in FIG. 7, and FIG. 9 is a view showing another embodiment of the relay in FIG. 7.

Figure 10:
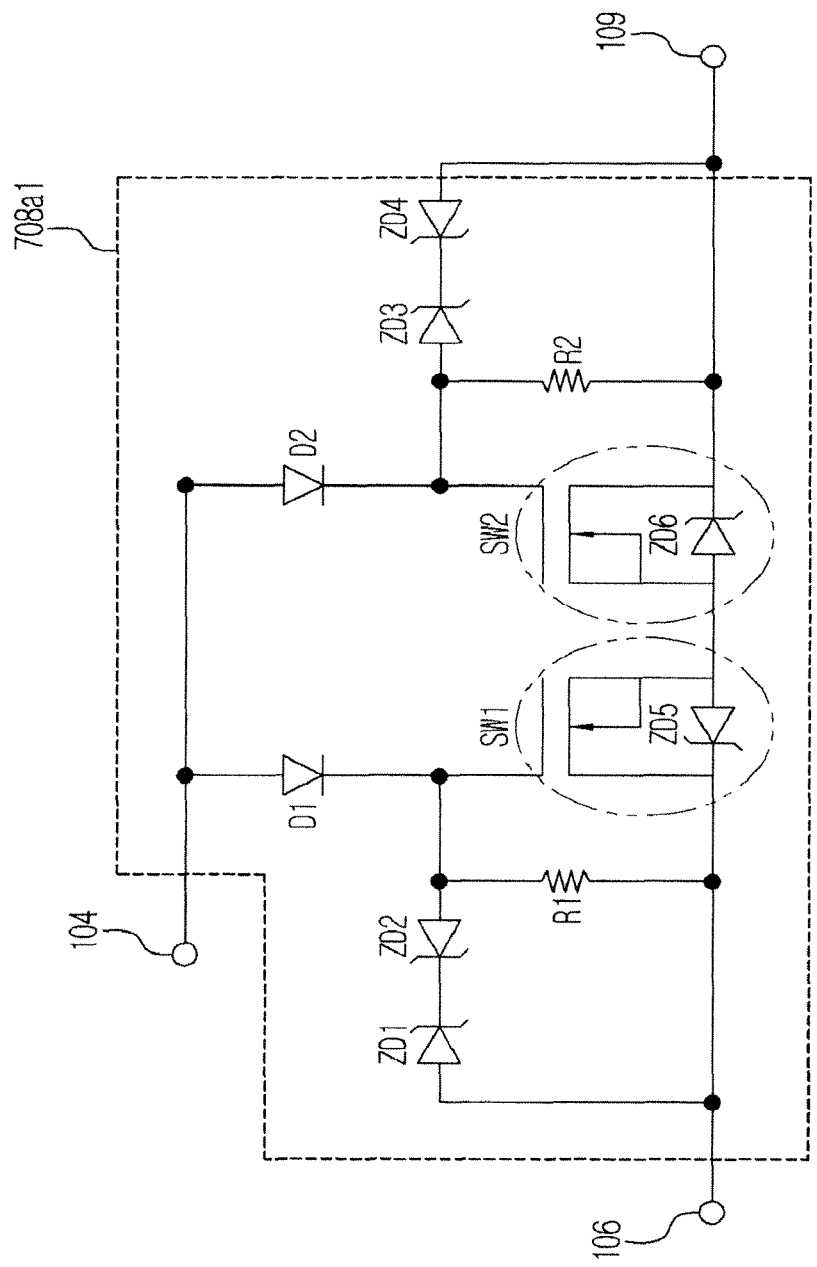
FIG. 10 is an equivalent circuit diagram showing an example of an internal configuration of the relay shown in FIG. 9.
Figure 11:
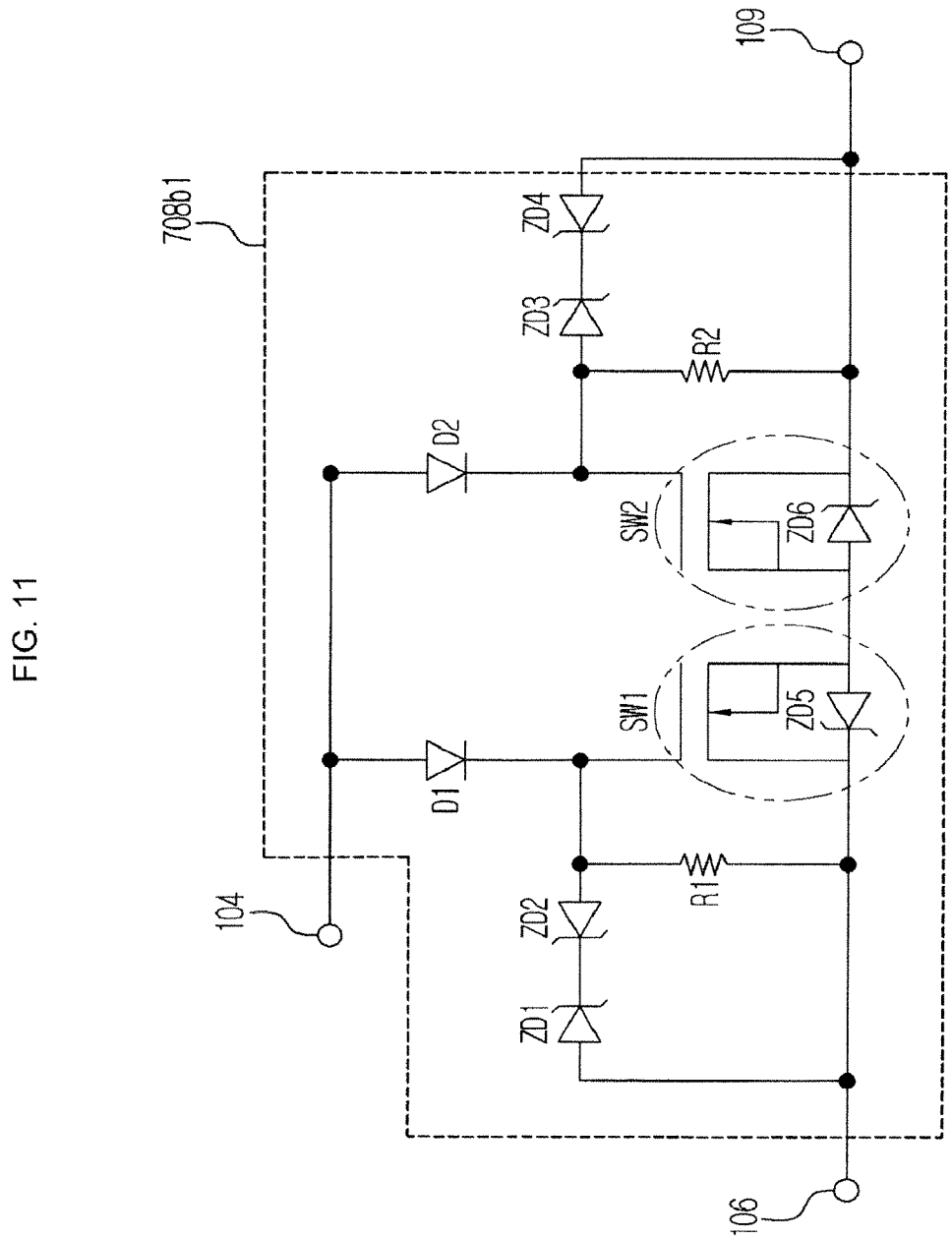
FIG. 11 is an equivalent circuit diagram showing another example of the internal configuration of the relay shown in FIG. 9.

FIG. 10 is an equivalent circuit diagram showing an example of an internal configuration of the relay shown in FIG. 9, and FIG. 11 is an equivalent circuit diagram showing another example of the internal configuration of the relay shown in FIG. 9.

Figure 12:
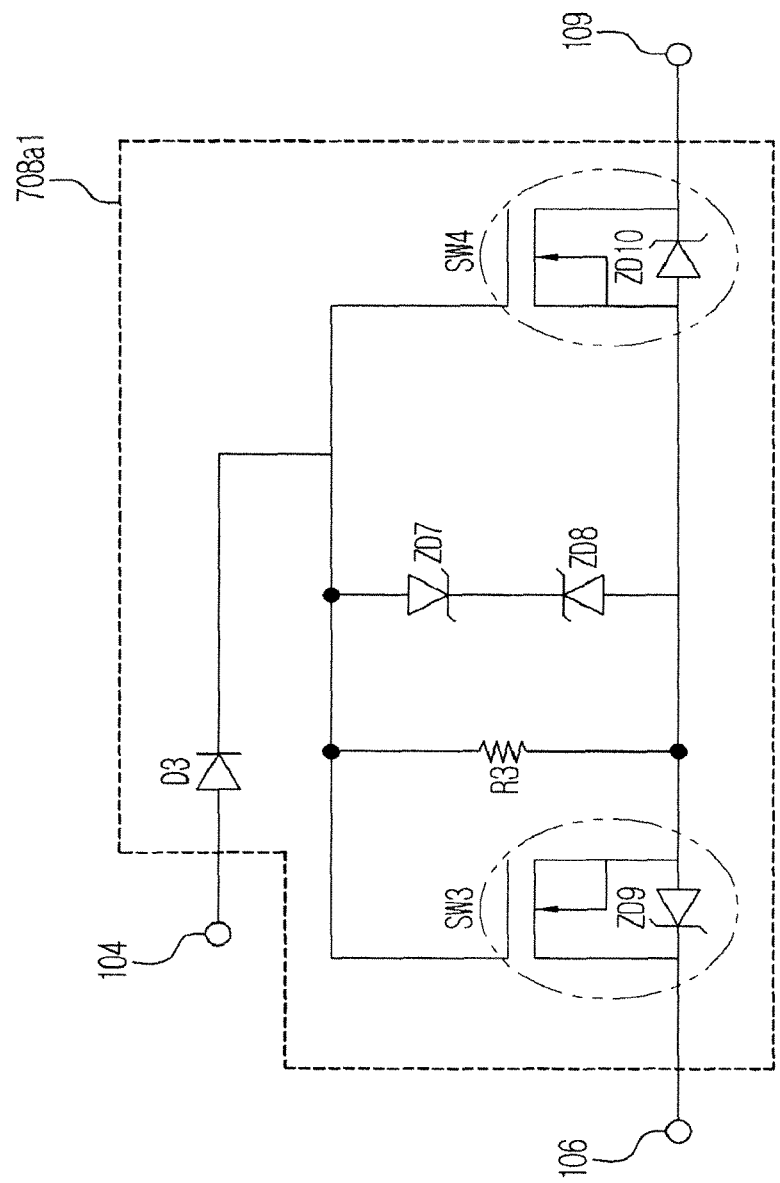
FIG. 12 is an equivalent circuit diagram showing another example of the internal configuration of the relay shown in FIG. 9.
Figure 13:
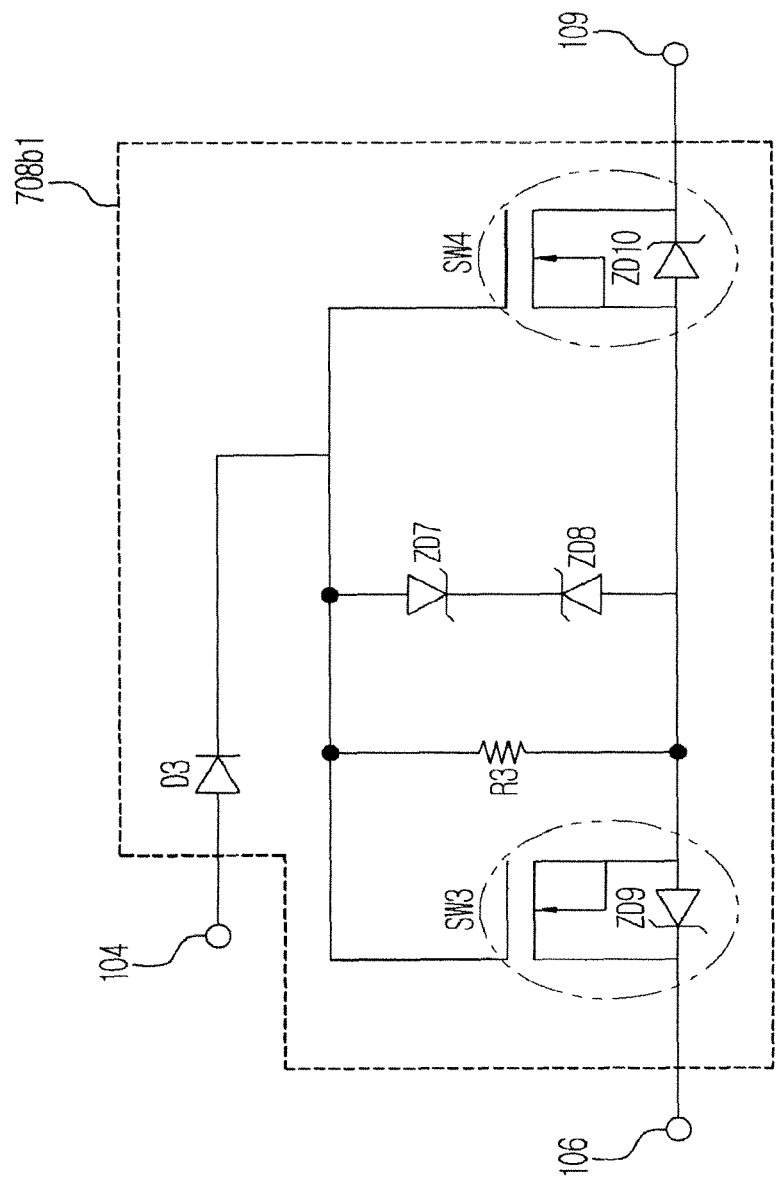
FIG. 13 is an equivalent circuit diagram showing another example of the internal configuration of the relay shown in FIG. 9.

FIG. 12 is an equivalent circuit diagram showing another example of the internal configuration of the relay shown in FIG. 9, and FIG. 13 is an equivalent circuit diagram showing another example of the internal configuration of the relay shown in FIG. 9.

Referring to FIGS. 7 to 13, the electric bicycle driving apparatus according to the second embodiment of the present invention, denoted by reference numeral 700, includes a speed change mode operator 102, a controller 104, a motor driver 106, a relay 708, and a motor 109.

The speed change mode operator 102 is provided to output a first speed change mode signal or a second speed change mode signal.

The speed change mode operator 102 may be provided at a portion of a handlebar of the electric bicycle 10.

The controller 104 receives the first speed change mode signal or second speed change mode signal output from the speed change mode operator 102 and outputs a first control signal corresponding to the first speed change mode signal or a second control signal corresponding to the second speed change mode signal.

The controller 104 may include an electronic controller unit (ECU) or a micro controller unit (MCU).

When the speed change mode operator 102 outputs a low-speed mode signal corresponding to the first speed change mode signal, the motor driver 106 receives the first control signal and outputs a first motor driving signal to drive the motor 109 in a low-speed mode corresponding to a first speed change mode. Also, when the speed change mode operator 102 outputs a high-speed mode signal corresponding to the second speed change mode signal, the motor driver 106 receives the second control signal and outputs a second motor driving signal to drive the motor 109, which is rotating with a driving force of the first motor driving signal, in a high-speed mode corresponding to a second speed change mode.

On the other hand, when the speed change mode operator 102 outputs the high-speed mode signal corresponding to the first speed change mode signal, the motor driver 106 receives the first control signal and outputs the first motor driving signal to drive the motor 109 in the high-speed mode corresponding to the first speed change mode. Also, when the speed change mode operator 102 outputs the low-speed mode signal corresponding to the second speed change mode signal, the motor driver 106 receives the second control signal and outputs the second motor driving signal to drive the motor 109, which is rotating with the driving force of the first motor driving signal, in the low-speed mode corresponding to the second speed change mode.

The relay 708 selectively receives a relay switching enable signal from the controller 104 so as to be turned on in response to the relay switching enable signal. Upon being turned on, the relay 708 provides the first motor driving signal and the second motor driving signal to the motor 109.

As shown in FIGS. 7 to 13, the relay 708 includes a first relay 708a to provide the first motor driving signal output from the motor driver 106 to the motor 109, and a second relay 708b to provide the second motor driving signal output from the motor driver 106 to the motor 109.

The first relay 708a and the second relay 708b may be electrically connected between an output stage of the motor driver 106 and an input stage of the motor 109.

As shown in FIGS. 9 to 11, the first relay 708a selectively receives a first relay switching enable signal of the relay switching enable signal so as to be turned on in response to the first relay switching enable signal. Upon being turned on, the first relay 708a supplies the first motor driving signal to the motor 109. Also, the second relay 708b selectively receives a second relay switching enable signal of the relay switching enable signal so as to be turned on in response to the second relay switching enable signal. Upon being turned on, the second relay 708b supplies the second motor driving signal to the motor 109.

The first relay 708a and the second relay 708b have internal circuits 708a1 and 708b1, respectively, each of which may include a first rectifying diode D1, a first switching device SW1, a first resistor R1, a second rectifying diode D2, a second switching device SW2, and a second resistor R2.

The first rectifying diode D1 may be electrically connected with one side of the controller 104, and the first switching device SW1 may be electrically connected with the first rectifying diode D1 and the motor driver 106.

Here, the first switching device SW1 may include at least one of a metal-oxide semiconductor field effect transistor (MOSFET) and a bipolar junction transistor (BJT).

In this case, the first switching device SW1 may further include at least one Zener diode ZD5 which is electrically connected with the first resistor R1, and the second switching device SW2 to be described later, to cut off an abnormal signal from the motor 109.

The first resistor R1 may be electrically connected with the first rectifying diode D1, the first switching device SW1 and the motor driver 106, and the second rectifying diode D2 may be electrically connected with the other side of the controller 104.

The second switching device SW2 may be electrically connected with the second rectifying diode D2, the first switching device SW1 and the motor 109, and the second resistor R2 may be electrically connected with the second rectifying diode D2, the second switching device SW2 and the motor 109.

Here, the second switching device SW2 may include at least one of a MOSFET and a BJT.

In this case, the second switching device SW2 may further include at least one Zener diode ZD6 which is electrically connected with the first switching device SW1 and the second resistor R2 to cut off an abnormal signal from the motor driver 106.

In each of the first relay 708a and second relay 708b with the above configuration, when the first and second switching devices SW1 and SW2 are turned on in response to the relay switching enable signal from the controller 104, rectified through the first and second rectifying diodes D1 and D2, the level of the first motor driving signal or second motor driving signal supplied from the motor driver 106 is adjusted by the first resistor R1 and in turn by the second resistor R2, and the first motor driving signal or second motor driving signal of the adjusted level is then supplied to the motor 109.

Also, each of the internal circuits 708a1 and 708b1 of the first relay 708a and second relay 708b may further include one or more Zener diodes ZD1 and ZD2 which are electrically connected with the motor driver 106 and the first resistor R1 to cut off an abnormal signal from the motor driver 106.

Also, each of the internal circuits 708a1 and 708b1 of the first relay 708a and second relay 708b may further include one or more Zener diodes ZD3 and ZD4 which are electrically connected with the second resistor R2 and the motor 109 to cut off an abnormal signal from the motor 109.

Alternatively, as shown in FIGS. 9, 12 and 13, the first relay 708a selectively receives the first relay switching enable signal of the relay switching enable signal so as to be turned on in response to the first relay switching enable signal. Upon being turned on, the first relay 708a supplies the first motor driving signal to the motor 109. Also, the second relay 708b selectively receives the second relay switching enable signal of the relay switching enable signal so as to be turned on in response to the second relay switching enable signal. Upon being turned on, the second relay 708b supplies the second motor driving signal to the motor 109.

Each of the internal circuits 708a1 and 708b1 of the first relay 708a and second relay 708b may include a third rectifying diode D3, a third switching device SW3, a third resistor R3, and a fourth switching device SW4.

The third rectifying diode D3 may be electrically connected with one side of the controller 104, and the third switching device SW3 may be electrically connected with the third rectifying diode D3 and the motor driver 106.

Here, the third switching device SW3 may include at least one of a MOSFET and a BJT.

In this case, the third switching device SW3 may further include at least one Zener diode ZD9 which is electrically connected with the motor driver 106 and the third resistor R3 to cut off an abnormal signal from the motor 109.

The third resistor R3 may be electrically connected with the third rectifying diode D3 and the third switching device SW3, and the fourth switching device SW4 may be electrically connected with the third rectifying diode D3, the third resistor R3 and the motor 109.

Here, the fourth switching device SW4 may include at least one of a MOSFET and a BJT.

In this case, the fourth switching device SW4 may further include at least one Zener diode ZD10 which is electrically connected with the third resistor R3 and the motor 109 to cut off an abnormal signal from the motor driver 106.

Also, each of the internal circuits 708a1 and 708b1 of the first relay 708a and second relay 708b may further include one or more Zener diodes ZD7 and ZD8 which are electrically connected with the third resistor R3, the third rectifying diode D3 and the fourth switching device SW4 to cut off an abnormal signal from at least one of the motor driver 106 and motor 109.

As stated above, the electric bicycle driving apparatus 700 according to the second embodiment of the present invention includes the speed change mode operator 102, the controller 104, the motor driver 106, the relay 708, and the motor 109.

Therefore, in the electric bicycle driving apparatus 700 according to the second embodiment of the present invention, when the first motor driving signal or second motor driving signal, output from the motor driver 106 for the speed change mode, is supplied to the motor 109, it may be possible to provide a faster switching response characteristic for a turn-on operation, thereby rapidly reducing a speed change mode time.

Further, in the electric bicycle driving apparatus 700 according to the second embodiment of the present invention, when the first motor driving signal or second motor driving signal, output from the motor driver 106 for the speed change mode, is supplied to the motor 109, it may be possible to reduce heat generation to prevent malfunction.

Moreover, in the electric bicycle driving apparatus 700 according to the second embodiment of the present invention, when the first motor driving signal or second motor driving signal, output from the motor driver 106 for the speed change mode, is supplied to the motor 109, the load to be driven is reduced, thereby reducing consumption of battery power.

In addition, in the electric bicycle driving apparatus 700 according to the second embodiment of the present invention, the first relay 708a and the second relay 708b are employed. Therefore, when the first motor driving signal or second motor driving signal, output from the motor driver 106 for the speed change mode, is supplied to the motor 109, each of the first relay 708a and second relay 708b may provide a faster switching response characteristic for a turn-on operation, thereby more rapidly reducing a speed change mode time.

<Third Embodiment>

Figure 14:
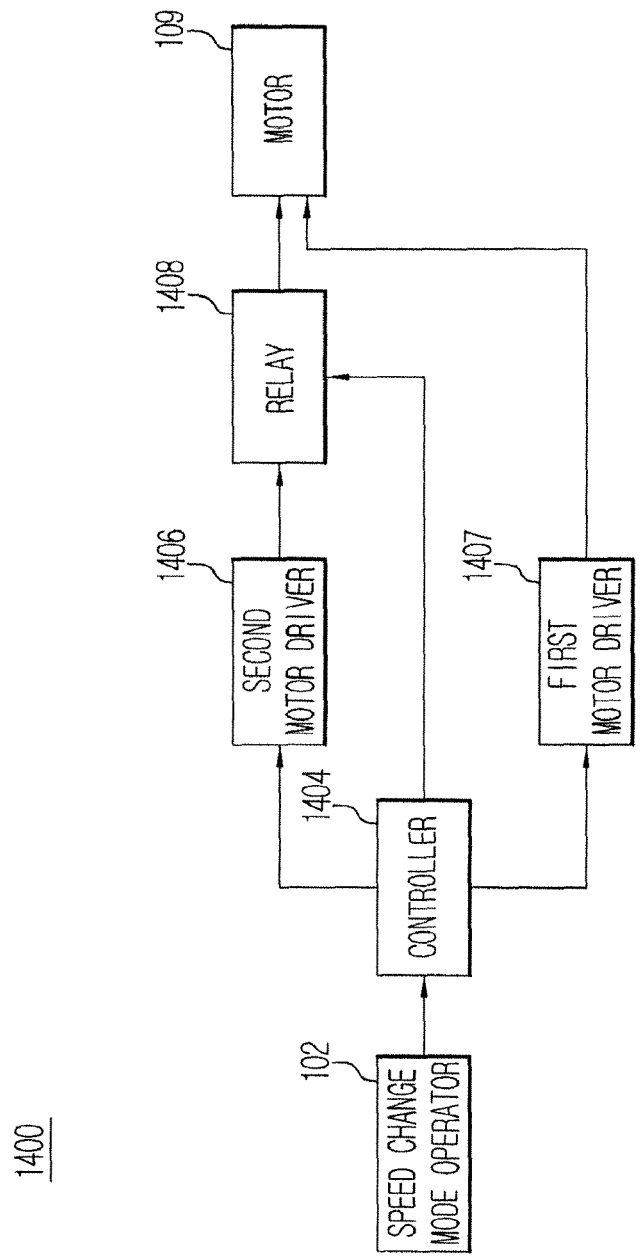
FIG. 14 is a block diagram showing the configuration of an electric bicycle driving apparatus according to a third embodiment of the present invention.
Figure 15:
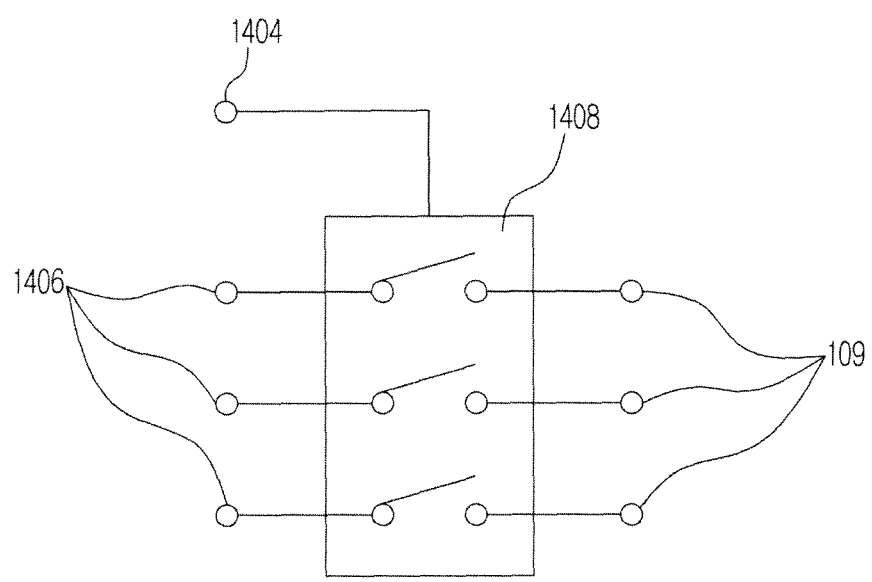
FIG. 15 is a view showing an embodiment of a relay in FIG. 14.
Figure 16:
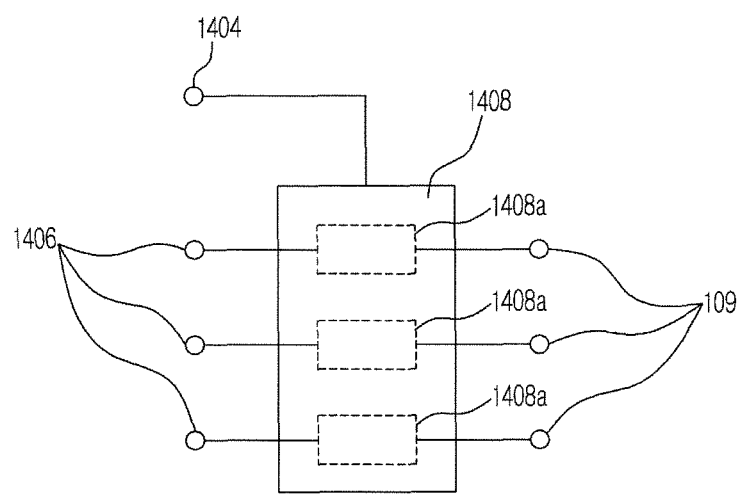
FIG. 16 is a view showing another embodiment of the relay in FIG. 14.

FIG. 14 is a block diagram showing the configuration of an electric bicycle driving apparatus according to a third embodiment of the present invention, FIG. 15 is a view showing an embodiment of a relay in FIG. 14, and FIG. 16 is a view showing another embodiment of the relay in FIG. 14.

Figure 17:
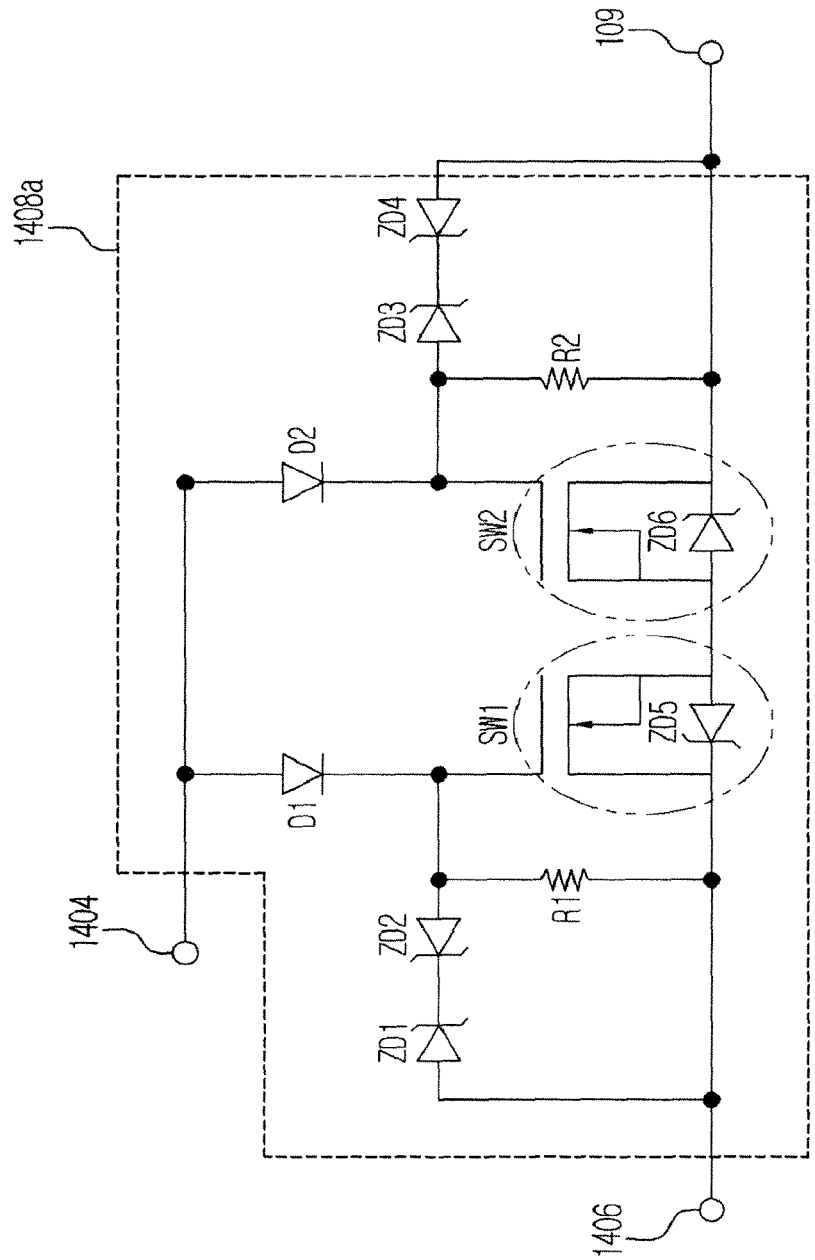
FIG. 17 is an equivalent circuit diagram showing an example of an internal configuration of the relay shown in FIG. 16.
Figure 18:
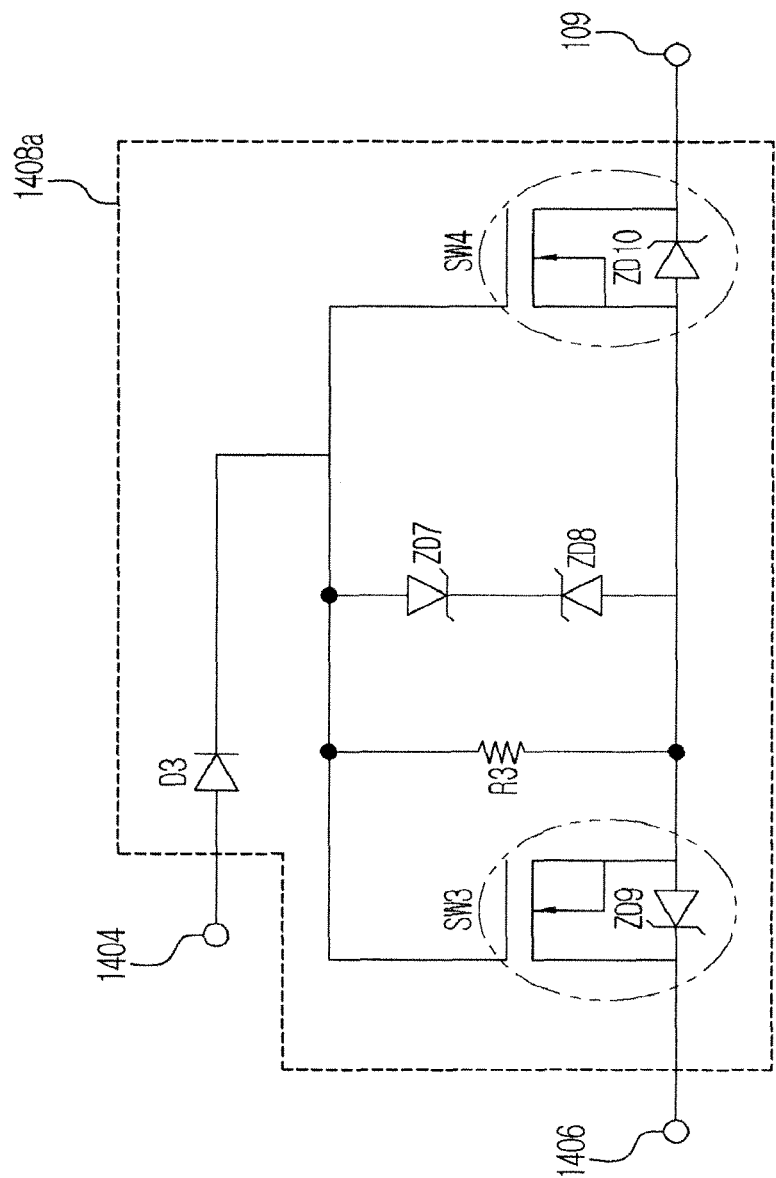
FIG. 18 is an equivalent circuit diagram showing another example of the internal configuration of the relay shown in FIG. 16.

FIG. 17 is an equivalent circuit diagram showing an example of an internal configuration of the relay shown in FIG. 16, and FIG. 18 is an equivalent circuit diagram showing another example of the internal configuration of the relay shown in FIG. 16.

Referring to FIGS. 14 to 18, the electric bicycle driving apparatus according to the third embodiment of the present invention, denoted by reference numeral 1400, includes a speed change mode operator 102, a controller 1404, a first motor driver 1407, a second motor driver 1406, a relay 1408, and a motor 109.

The speed change mode operator 102 is provided to output a first speed change mode signal or a second speed change mode signal.

The speed change mode operator 102 may be provided at a portion of a handlebar of the electric bicycle 10.

The controller 1404 receives the first speed change mode signal or second speed change mode signal output from the speed change mode operator 102 and outputs a first control signal corresponding to the first speed change mode signal or a second control signal corresponding to the second speed change mode signal.

The controller 1404 may include an electronic controller unit (ECU) or a micro controller unit (MCU).

When the speed change mode operator 102 outputs a low-speed mode signal corresponding to the first speed change mode signal, the first motor driver 1407 receives the first control signal and outputs a first motor driving signal to drive the motor 109 in a low-speed mode corresponding to a first speed change mode. Also, when the speed change mode operator 102 outputs a high-speed mode signal corresponding to the second speed change mode signal, the second motor driver 1406 receives the second control signal and outputs a second motor driving signal to drive the motor 109, which is rotating with a driving force of the first motor driving signal, in a high-speed mode corresponding to a second speed change mode.

On the other hand, when the speed change mode operator 102 outputs the high-speed mode signal corresponding to the first speed change mode signal, the second motor driver 1406 receives the first control signal and outputs the first motor driving signal to drive the motor 109 in the high-speed mode corresponding to the first speed change mode. Also, when the speed change mode operator 102 outputs the low-speed mode signal corresponding to the second speed change mode signal, the first motor driver 1407 receives the second control signal and outputs the second motor driving signal to drive the motor 109, which is rotating with the driving force of the first motor driving signal, in the low-speed mode corresponding to the second speed change mode.

The relay 1408 selectively receives a relay switching enable signal from the controller 1404 so as to be turned on in response to the relay switching enable signal. Upon being turned on, the relay 1408 provides at least one of the first motor driving signal and second motor driving signal to the motor 109.

As shown in FIGS. 14 to 18, the relay 1408 may be electrically connected between an output stage of the second motor driver 1406 and an input stage of the motor 109.

The relay 1408 has an internal circuit 1408a, which may include a first rectifying diode D1, a first switching device SW1, a first resistor R1, a second rectifying diode D2, a second switching device SW2, and a second resistor R2, as shown in FIGS. 16 and 17.

The first rectifying diode D1 may be electrically connected with one side of the controller 1404, and the first switching device SW1 may be electrically connected with the first rectifying diode D1 and the second motor driver 1406.

Here, the first switching device SW1 may include at least one of a metal-oxide semiconductor field effect transistor (MOSFET) and a bipolar junction transistor (BJT).

In this case, the first switching device SW1 may further include at least one Zener diode ZD5 which is electrically connected with the first resistor R1, and the second switching device SW2 to be described later, to cut off an abnormal signal from the motor 109.

The first resistor R1 may be electrically connected with the first rectifying diode D1, the first switching device SW1 and the second motor driver 1406, and the second rectifying diode D2 may be electrically connected with the other side of the controller 1404.

The second switching device SW2 may be electrically connected with the second rectifying diode D2, the first switching device SW1 and the motor 109, and the second resistor R2 may be electrically connected with the second rectifying diode D2, the second switching device SW2 and the motor 109.

Here, the second switching device SW2 may include at least one of a MOSFET and a BJT.

In this case, the second switching device SW2 may further include at least one Zener diode ZD6 which is electrically connected with the first switching device SW1 and the second resistor R2 to cut off an abnormal signal from the second motor driver 1406.

In the relay 1408 with the above configuration, when the first and second switching devices SW1 and SW2 are turned on in response to the relay switching enable signal from the controller 1404, rectified through the first and second rectifying diodes D1 and D2, the level of the first motor driving signal or second motor driving signal supplied from the second motor driver 1406 is adjusted by the first resistor R1 and in turn by the second resistor R2, and the first motor driving signal or second motor driving signal of the adjusted level is then supplied to the motor 109.

Also, the internal circuit 1408a of the relay 1408 may further include one or more Zener diodes ZD1 and ZD2 which are electrically connected with the second motor driver 1406 and the first resistor R1 to cut off an abnormal signal from the second motor driver 1406.

Also, the internal circuit 1408a of the relay 1408 may further include one or more Zener diodes ZD3 and ZD4 which are electrically connected with the second resistor R2 and the motor 109 to cut off an abnormal signal from the motor 109.

Alternatively, as shown in FIGS. 16 and 18, the internal circuit 1408a of the relay 1408 may include a third rectifying diode D3, a third switching device SW3, a third resistor R3, and a fourth switching device SW4.

The third rectifying diode D3 may be electrically connected with one side of the controller 1404, and the third switching device SW3 may be electrically connected with the third rectifying diode D3 and the second motor driver 1406.

Here, the third switching device SW3 may include at least one of a MOSFET and a BJT.

In this case, the third switching device SW3 may further include at least one Zener diode ZD9 which is electrically connected with the second motor driver 1406 and the third resistor R3 to cut off an abnormal signal from the motor 109.

The third resistor R3 may be electrically connected with the third rectifying diode D3 and the third switching device SW3, and the fourth switching device SW4 may be electrically connected with the third rectifying diode D3, the third resistor R3 and the motor 109.

Here, the fourth switching device SW4 may include at least one of a MOSFET and a BJT.

In this case, the fourth switching device SW4 may further include at least one Zener diode ZD10 which is electrically connected with the third resistor R3 and the motor 109 to cut off an abnormal signal from the second motor driver 1406.

Also, the internal circuit 1408a of the relay 1408 may further include one or more Zener diodes ZD7 and ZD8 which are electrically connected with the third resistor R3, the third rectifying diode D3 and the fourth switching device SW4 to cut off an abnormal signal from at least one of the second motor driver 1406 and motor 109.

As stated above, the electric bicycle driving apparatus 1400 according to the third embodiment of the present invention includes the speed change mode operator 102, the controller 1404, the first motor driver 1407, the second motor driver 1406, the relay 1408, and the motor 109.

Therefore, in the electric bicycle driving apparatus 1400 according to the third embodiment of the present invention,
when the first motor driving signal or second motor driving signal, output from the first motor driver 1407 or second motor driver 1406 for the speed change mode, is supplied to the motor 109, it may be possible to provide a faster switching response characteristic for a turn-on operation, thereby rapidly reducing a speed change mode time.

Further, in the electric bicycle driving apparatus 1400 according to the third embodiment of the present invention, when the first motor driving signal or second motor driving signal, output from the first motor driver 1407 or second motor driver 1406 for the speed change mode, is supplied to the motor 109, it may be possible to reduce heat generation to prevent malfunction.

Moreover, in the electric bicycle driving apparatus 1400 according to the third embodiment of the present invention, when the first motor driving signal or second motor driving signal, output from the first motor driver 1407 or second motor driver 1406 for the speed change mode, is supplied to the motor 109, the load to be driven is reduced still further, thereby reducing consumption of battery power still further.

In addition, in the electric bicycle driving apparatus 1400 according to the third embodiment of the present invention, the unified relay 1408 is employed, thereby making it possible to suppress an increase in cost of parts manufactured for the speed change mode.

<Fourth Embodiment>

Figure 19:
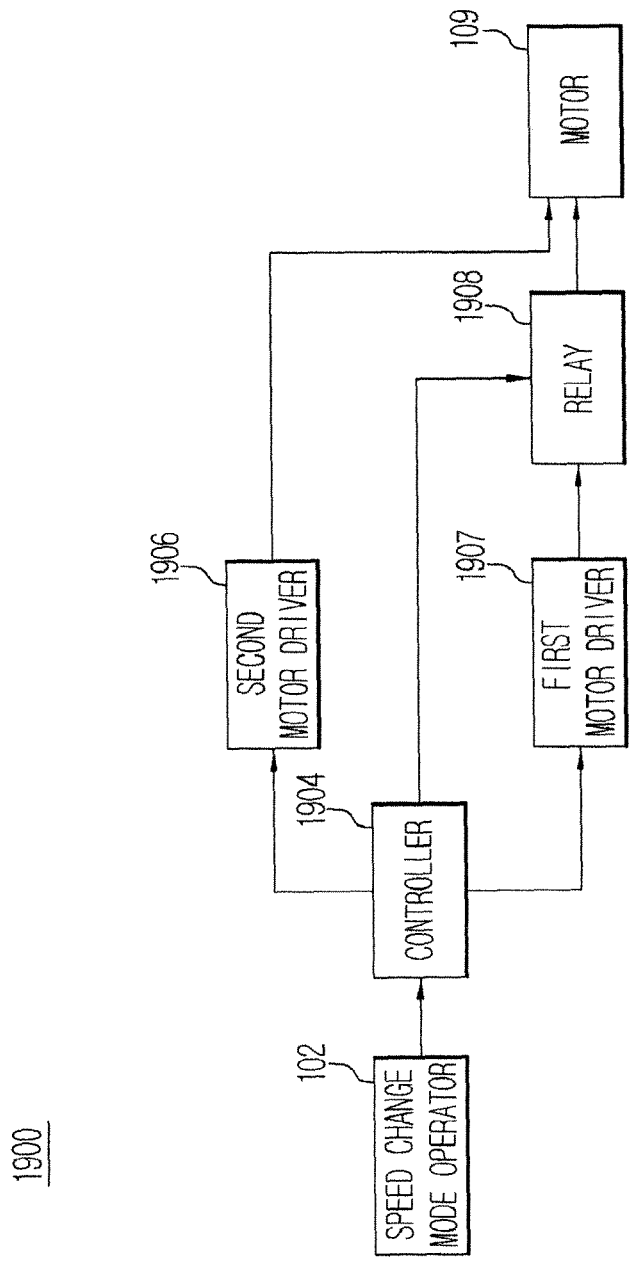
FIG. 19 is a block diagram showing the configuration of an electric bicycle driving apparatus according to a fourth embodiment of the present invention.
Figure 20:
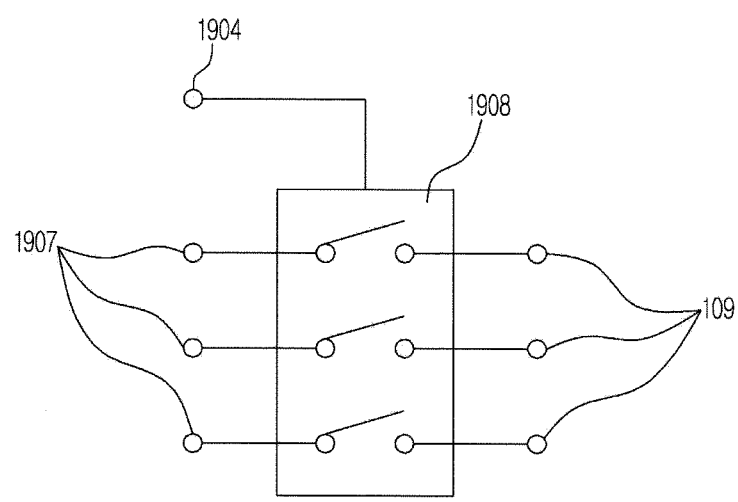
FIG. 20 is a view showing an embodiment of a relay in FIG. 19.
Figure 21:
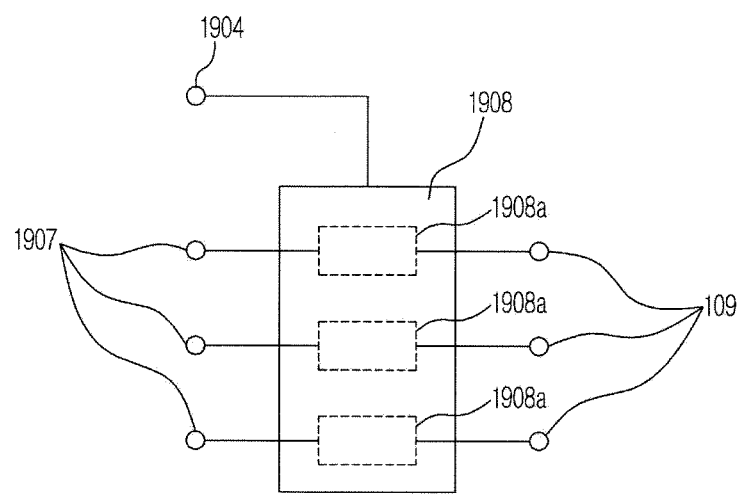
FIG. 21 is a view showing another embodiment of the relay in FIG. 19.

FIG. 19 is a block diagram showing the configuration of an electric bicycle driving apparatus according to a fourth embodiment of the present invention, FIG. 20 is a view showing an embodiment of a relay in FIG. 19, and FIG. 21 is a view showing another embodiment of the relay in FIG. 19.

Figure 22:
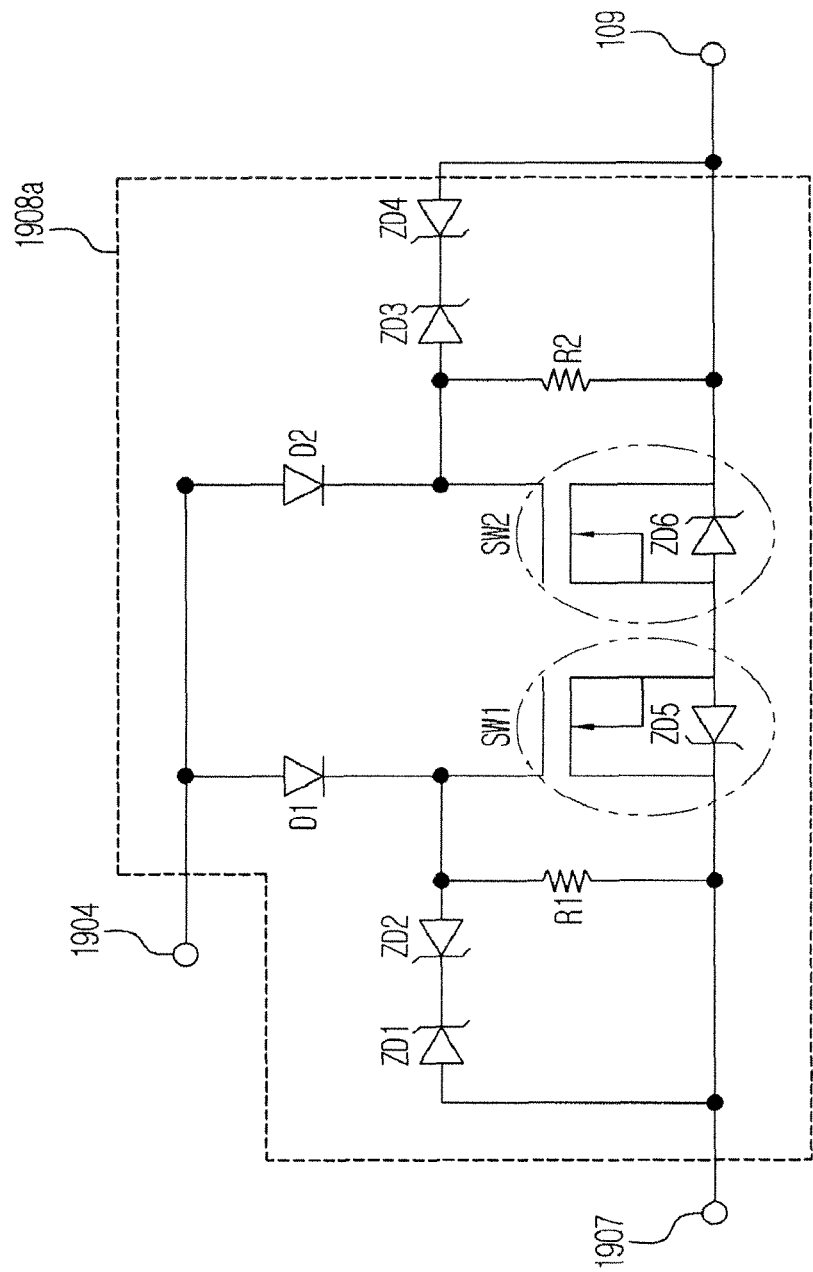
FIG. 22 is an equivalent circuit diagram showing an example of an internal configuration of the relay shown in FIG. 21.
Figure 23:
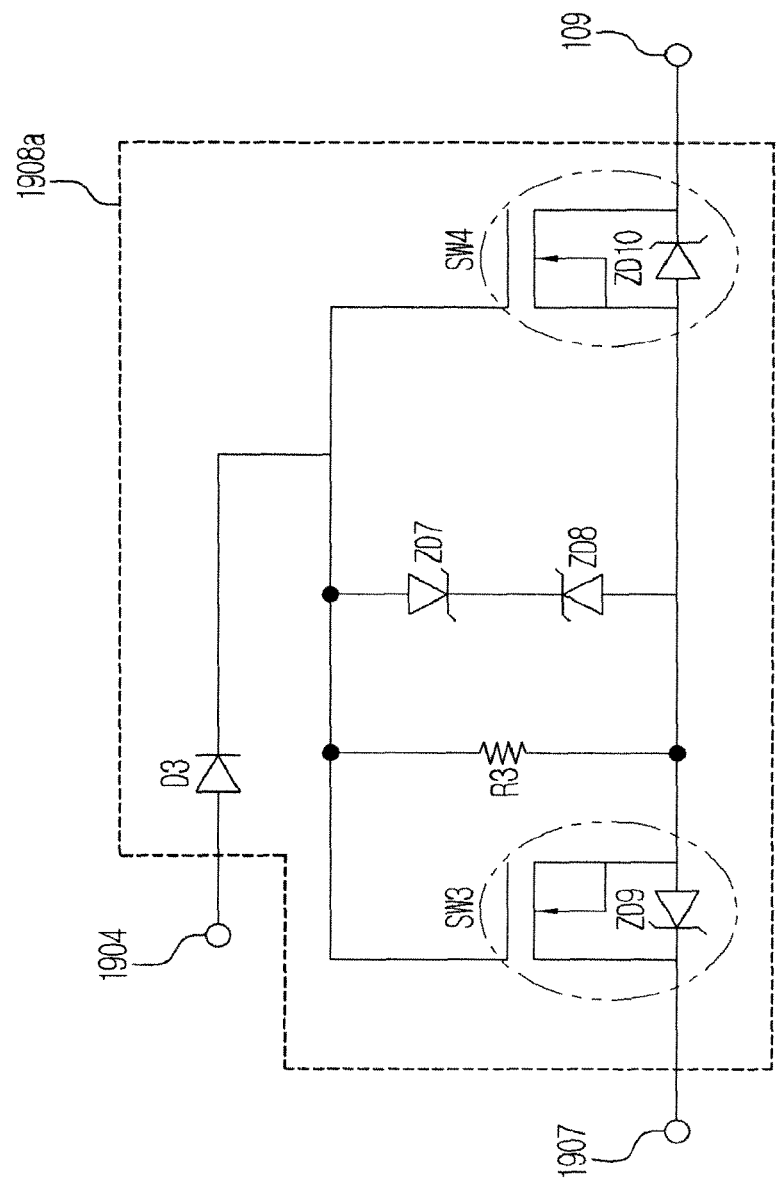
FIG. 23 is an equivalent circuit diagram showing another example of the internal configuration of the relay shown in FIG. 21.

FIG. 22 is an equivalent circuit diagram showing an example of an internal configuration of the relay shown in FIG. 21, and FIG. 23 is an equivalent circuit diagram showing another example of the internal configuration of the relay shown in FIG. 21.

Referring to FIGS. 19 to 23, the electric bicycle driving apparatus according to the fourth embodiment of the present invention, denoted by reference numeral 1900, includes a speed change mode operator 102, a controller 1904, a first motor driver 1907, a second motor driver 1906, a relay 1908, and a motor 109.

The speed change mode operator 102 is provided to output a first speed change mode signal or a second speed change mode signal.

The speed change mode operator 102 may be provided at a portion of a handlebar of the electric bicycle 10.

The controller 1904 receives the first speed change mode signal or second speed change mode signal output from the speed change mode operator 102 and outputs a first control signal corresponding to the first speed change mode signal or a second control signal corresponding to the second speed change mode signal.

The controller 1904 may include an electronic controller unit (ECU) or a micro controller unit (MCU).

When the speed change mode operator 102 outputs a low-speed mode signal corresponding to the first speed change mode signal, the first motor driver 1907 receives the first control signal and outputs a first motor driving signal to drive the motor 109 in a low-speed mode corresponding to a first speed change mode. Also, when the speed change mode operator 102 outputs a high-speed mode signal corresponding to the second speed change mode signal, the second motor driver 1906 receives the second control signal and outputs a second motor driving signal to drive the motor 109, which is rotating with a driving force of the first motor driving signal, in a high-speed mode corresponding to a second speed change mode.

On the other hand, when the speed change mode operator 102 outputs the high-speed mode signal corresponding to the first speed change mode signal, the second motor driver 1906 receives the first control signal and outputs the first motor driving signal to drive the motor 109 in the high-speed mode corresponding to the first speed change mode. Also, when the speed change mode operator 102 outputs the low-speed mode signal corresponding to the second speed change mode signal, the first motor driver 1907 receives the second control signal and outputs the second motor driving signal to drive the motor 109, which is rotating with the driving force of the first motor driving signal, in the low-speed mode corresponding to the second speed change mode.

The relay 1908 selectively receives a relay switching enable signal from the controller 1904 so as to be turned on in response to the relay switching enable signal. Upon being turned on, the relay 1908 provides at least one of the first motor driving signal and second motor driving signal to the motor 109.

As shown in FIGS. 19 to 23, the relay 1908 may be electrically connected between an output stage of the first motor driver 1907 and an input stage of the motor 109.

The relay 1908 has an internal circuit 1908a, which may include a first rectifying diode D1, a first switching device SW1, a first resistor R1, a second rectifying diode D2, a second switching device SW2, and a second resistor R2, as shown in FIGS. 21 and 22.

The first rectifying diode D1 may be electrically connected with one side of the controller 1904, and the first switching device SW1 may be electrically connected with the first rectifying diode D1 and the first motor driver 1907.

Here, the first switching device SW1 may include at least one of a metal-oxide semiconductor field effect transistor (MOSFET) and a bipolar junction transistor (BJT).

In this case, the first switching device SW1 may further include at least one Zener diode ZD5 which is electrically connected with the first resistor R1, and the second switching device SW2 to be described later, to cut off an abnormal signal from the motor 109.

The first resistor R1 may be electrically connected with the first rectifying diode D1, the first switching device SW1 and the first motor driver 1907, and the second rectifying diode D2 may be electrically connected with the other side of the controller 1904.

The second switching device SW2 may be electrically connected with the second rectifying diode D2, the first switching device SW1 and the motor 109, and the second resistor R2 may be electrically connected with the second rectifying diode D2, the second switching device SW2 and the motor 109.

Here, the second switching device SW2 may include at least one of a MOSFET and a BJT.

In this case, the second switching device SW2 may further include at least one Zener diode ZD6 which is electrically connected with the first switching device SW1 and the second resistor R2 to cut off an abnormal signal from the first motor driver 1907.

In the relay 1908 with the above configuration, when the first and second switching devices SW1 and SW2 are turned on in response to the relay switching enable signal from the controller 1904, rectified through the first and second rectifying diodes D1 and D2, the level of the first motor driving signal or second motor driving signal supplied from the first motor driver 1907 is adjusted by the first resistor R1 and in turn by the second resistor R2, and the first motor driving signal or second motor driving signal of the adjusted level is then supplied to the motor 109.

Also, the internal circuit 1908a of the relay 1908 may further include one or more Zener diodes ZD1 and ZD2 which are electrically connected with the first motor driver 1907 and the first resistor R1 to cut off an abnormal signal from the first motor driver 1907.

Also, the internal circuit 1908a of the relay 1908 may further include one or more Zener diodes ZD3 and ZD4 which are electrically connected with the second resistor R2 and the motor 109 to cut off an abnormal signal from the motor 109.

Alternatively, as shown in FIGS. 21 and 23, the internal circuit 1908a of the relay 1908 may include a third rectifying diode D3, a third switching device SW3, a third resistor R3, and a fourth switching device SW4.

The third rectifying diode D3 may be electrically connected with one side of the controller 1904, and the third switching device SW3 may be electrically connected with the third rectifying diode D3 and the first motor driver 1907.

Here, the third switching device SW3 may include at least one of a MOSFET and a BJT.

In this case, the third switching device SW3 may further include at least one Zener diode ZD9 which is electrically connected with the first motor driver 1907 and the third resistor R3 to cut off an abnormal signal from the motor 109.

The third resistor R3 may be electrically connected with the third rectifying diode D3 and the third switching device SW3, and the fourth switching device SW4 may be electrically connected with the third rectifying diode D3, the third resistor R3 and the motor 109.

Here, the fourth switching device SW4 may include at least one of a MOSFET and a BJT.

In this case, the fourth switching device SW4 may further include at least one Zener diode ZD10 which is electrically connected with the third resistor R3 and the motor 109 to cut off an abnormal signal from the first motor driver 1907.

Also, the internal circuit 1908a of the relay 1908 may further include one or more Zener diodes ZD7 and ZD8 which are electrically connected with the third resistor R3, the third rectifying diode D3 and the fourth switching device SW4 to cut off an abnormal signal from at least one of the first motor driver 1907 and motor 109.

As stated above, the electric bicycle driving apparatus 1900 according to the fourth embodiment of the present invention includes the speed change mode operator 102, the controller 1904, the first motor driver 1907, the second motor driver 1906, the relay 1908, and the motor 109.

Therefore, in the electric bicycle driving apparatus 1900 according to the fourth embodiment of the present invention, when the first motor driving signal or second motor driving signal, output from the first motor driver 1907 or second motor driver 1906 for the speed change mode, is supplied to the motor 109, it may be possible to provide a faster switching response characteristic for a turn-on operation, thereby rapidly reducing a speed change mode time.

Further, in the electric bicycle driving apparatus 1900 according to the fourth embodiment of the present invention, when the first motor driving signal or second motor driving signal, output from the first motor driver 1907 or second motor driver 1906 for the speed change mode, is supplied to the motor 109, it may be possible to reduce heat generation to prevent malfunction.

Moreover, in the electric bicycle driving apparatus 1900 according to the fourth embodiment of the present invention, when the first motor driving signal or second motor driving signal, output from the first motor driver 1907 or second motor driver 1906 for the speed change mode, is supplied to the motor 109, the load to be driven is reduced still further, thereby reducing consumption of battery power still further.

In addition, in the electric bicycle driving apparatus 1900 according to the fourth embodiment of the present invention, the unified relay 1908 is employed, thereby making it possible to suppress an increase in cost of parts manufactured for the speed change mode.

<Fifth Embodiment>

Figure 24:
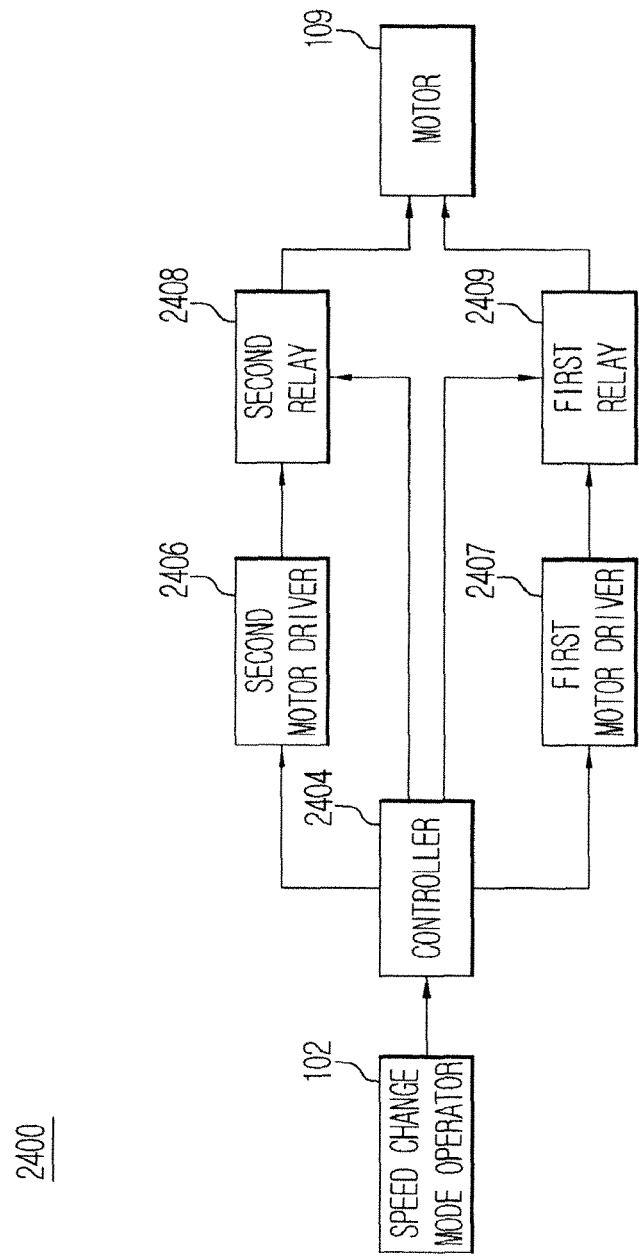
FIG. 24 is a block diagram showing the configuration of an electric bicycle driving apparatus according to a fifth embodiment of the present invention.
Figure 25:
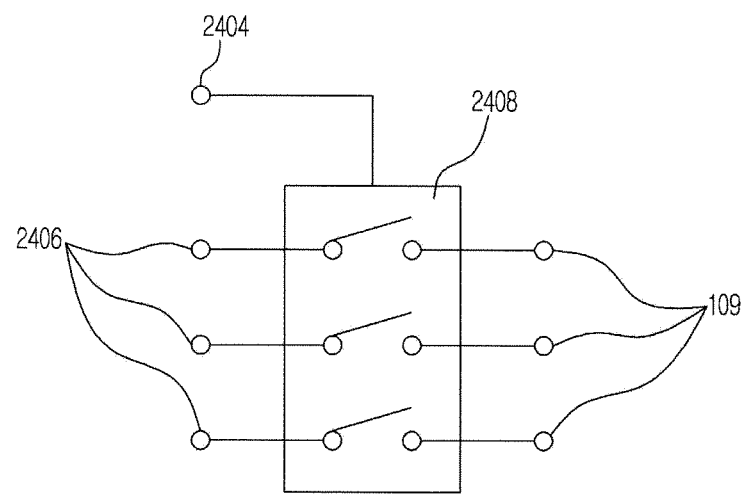
FIG. 25 is a view showing an embodiment of a relay connected to a second motor driver, shown in FIG. 24.
Figure 26:
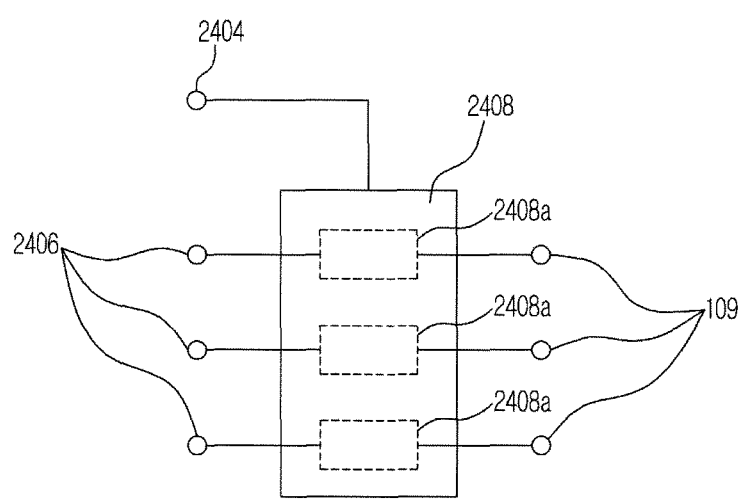
FIG. 26 is a view showing another embodiment of the relay connected to the second motor driver, shown in FIG. 24.

FIG. 24 is a block diagram showing the configuration of an electric bicycle driving apparatus according to a fifth embodiment of the present invention, FIG. 25 is a view showing an embodiment of a relay connected to a second motor driver, shown in FIG. 24, and FIG. 26 is a view showing another embodiment of the relay connected to the second motor driver, shown in FIG. 24.

Figure 27:
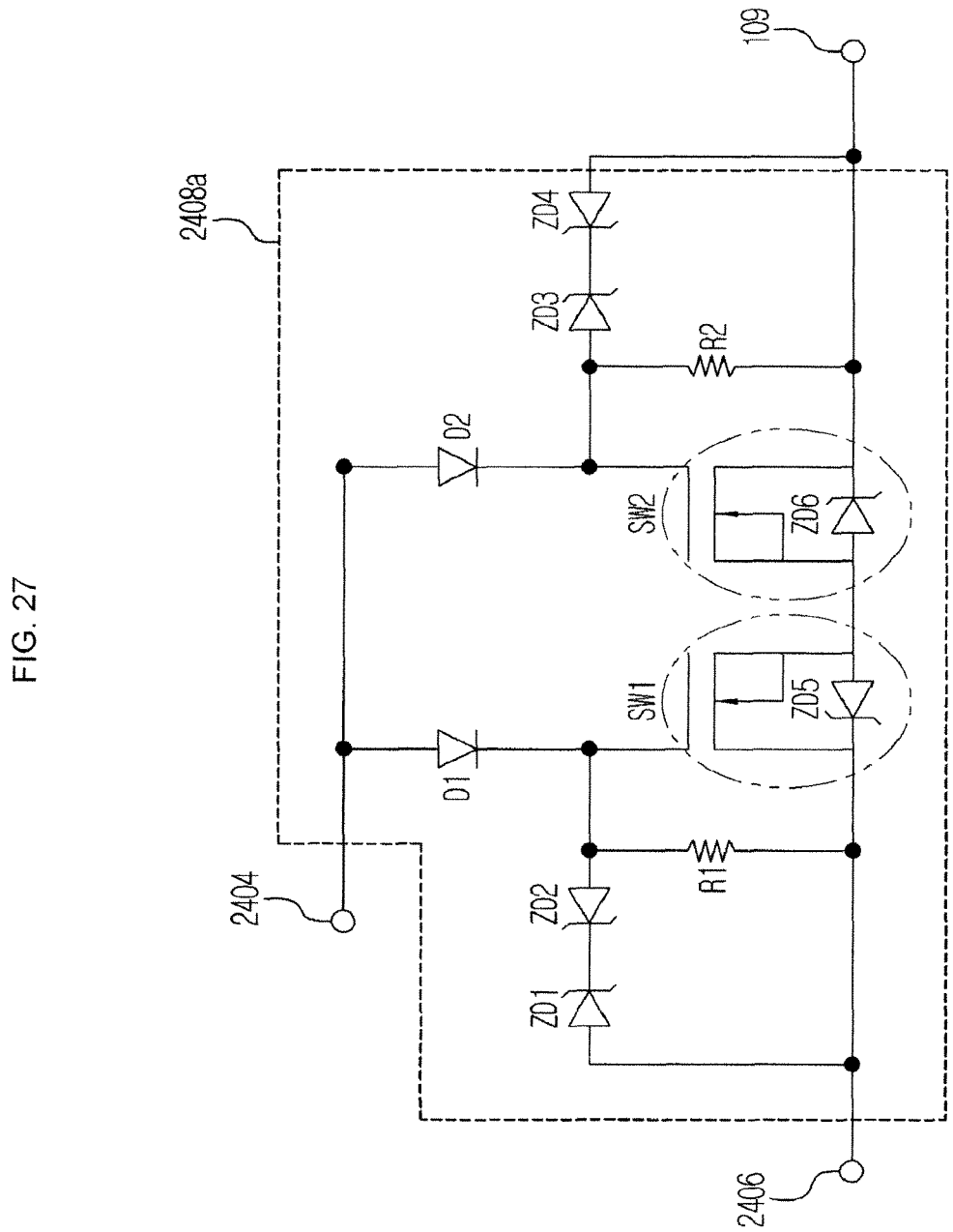
FIG. 27 is an equivalent circuit diagram showing an example of an internal configuration of the relay shown in FIG. 26.
Figure 28:
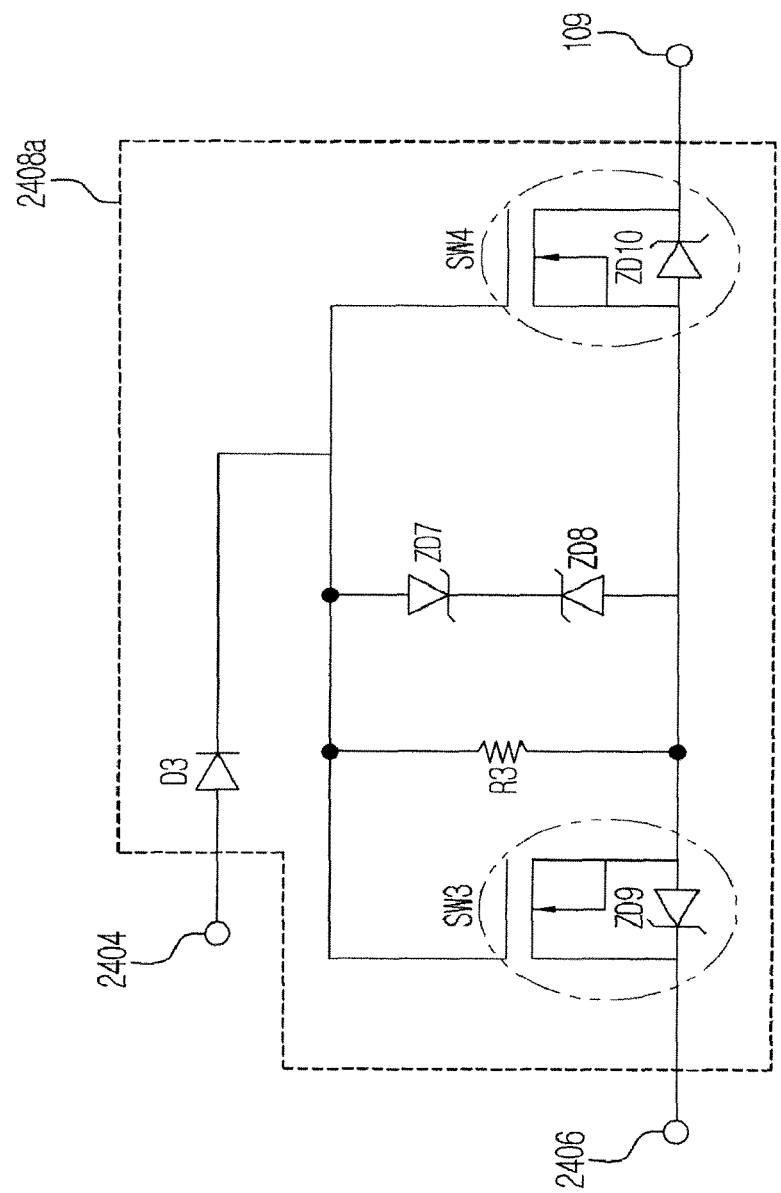
FIG. 28 is an equivalent circuit diagram showing another example of the internal configuration of the relay shown in FIG. 26.

FIG. 27 is an equivalent circuit diagram showing an example of an internal configuration of the relay shown in FIG. 26, and FIG. 28 is an equivalent circuit diagram showing another example of the internal configuration of the relay shown in FIG. 26.

Figure 29:
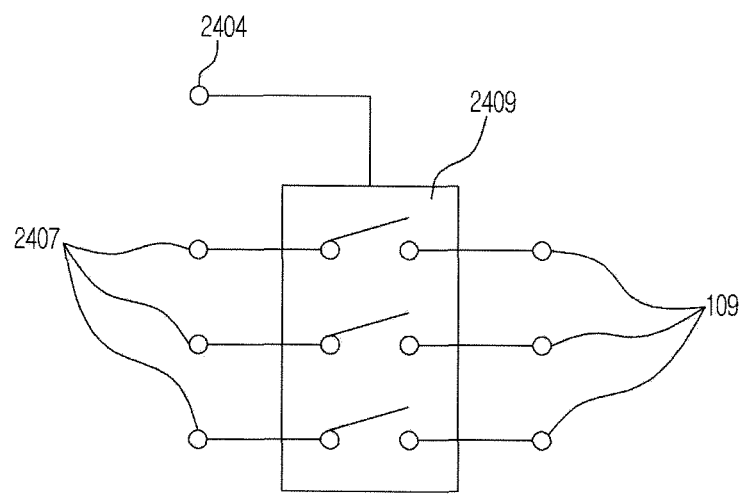
FIG. 29 is a view showing an embodiment of a relay connected to a first motor driver, shown in FIG. 24.
Figure 30:
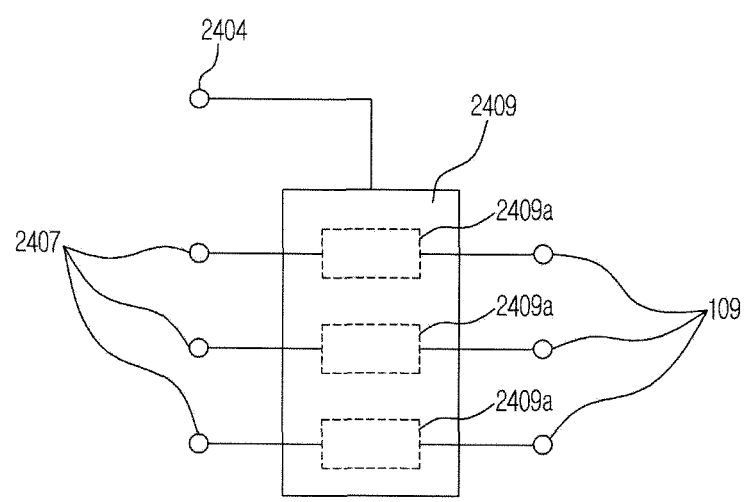
FIG. 30 is a view showing another embodiment of the relay connected to the first motor driver, shown in FIG. 24.

FIG. 29 is a view showing an embodiment of a relay connected to a first motor driver, shown in FIG. 24, and FIG. 30 is a view showing another embodiment of the relay connected to the first motor driver, shown in FIG. 24.

Figure 31:
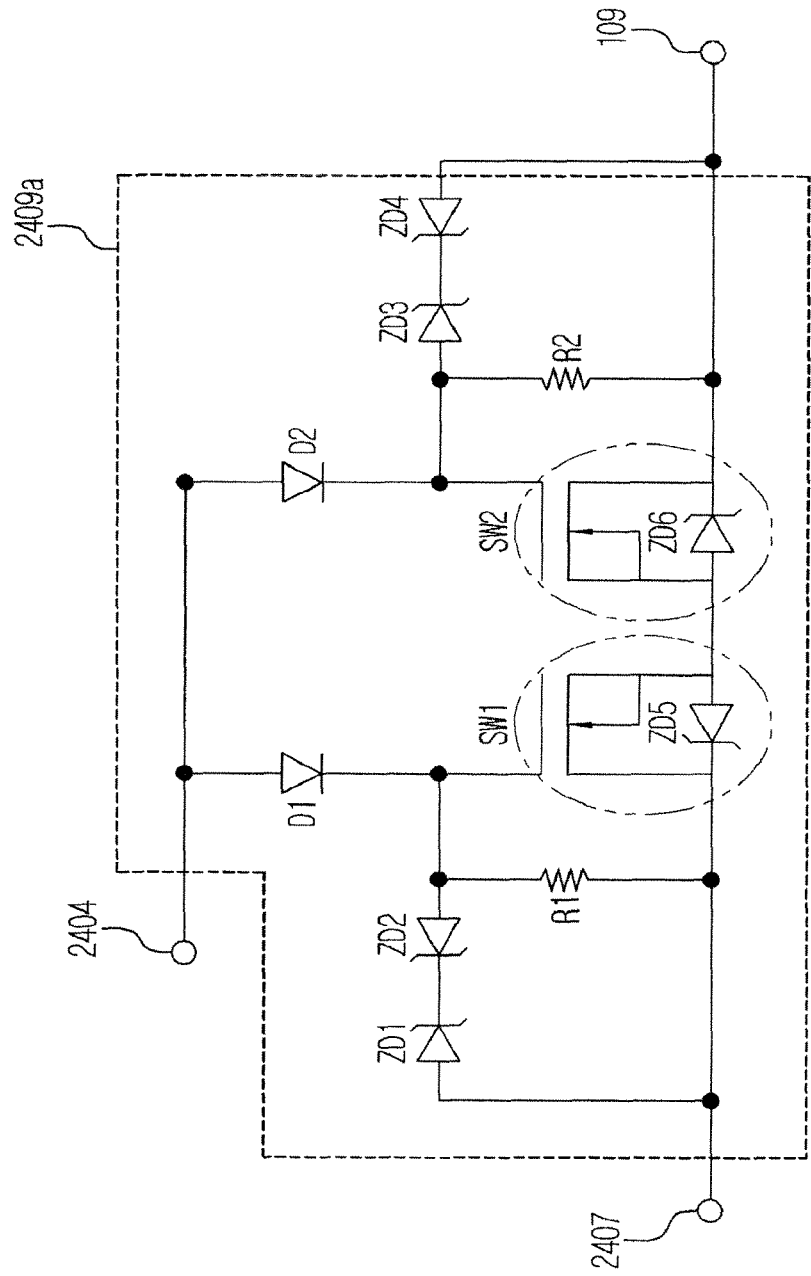
FIG. 31 is an equivalent circuit diagram showing an example of an internal configuration of the relay shown in FIG. 30.
Figure 32:
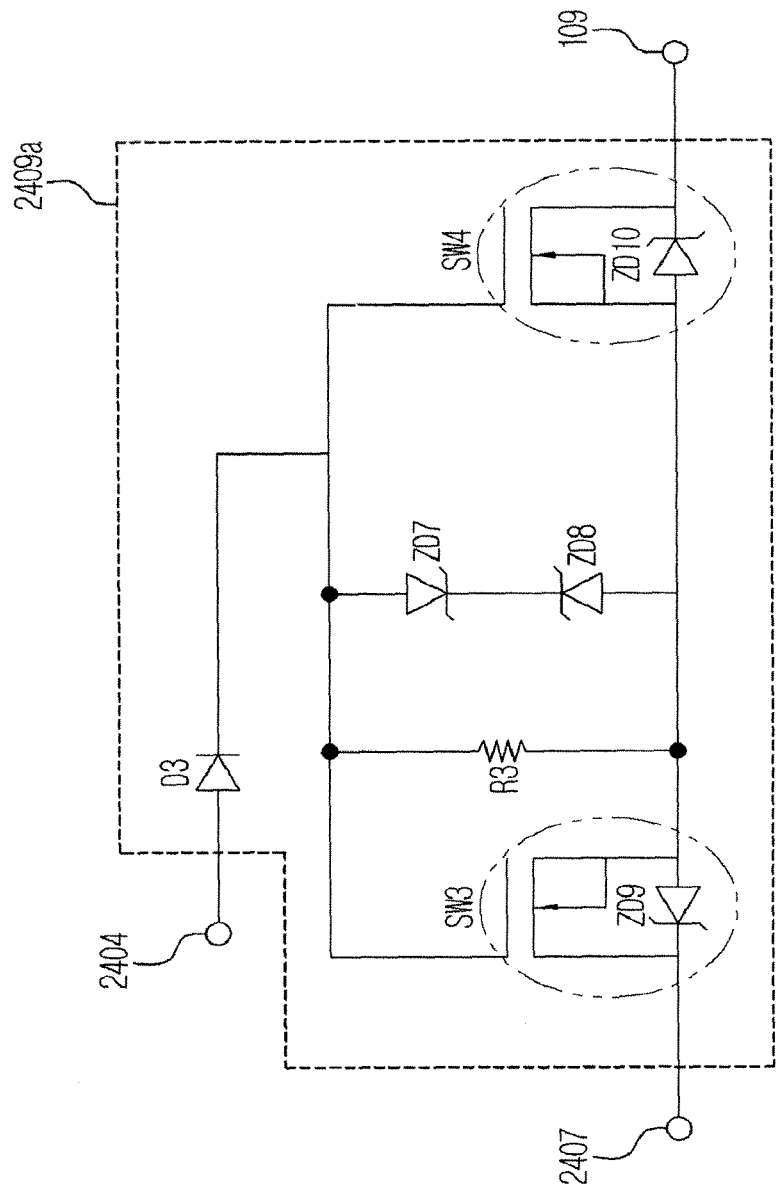
FIG. 32 is an equivalent circuit diagram showing another example of the internal configuration of the relay shown in FIG. 30.

FIG. 31 is an equivalent circuit diagram showing an example of an internal configuration of the relay shown in FIG. 30, and FIG. 32 is an equivalent circuit diagram showing another example of the internal configuration of the relay shown in FIG. 30.

Referring to FIGS. 24 to 32, the electric bicycle driving apparatus according to the fifth embodiment of the present invention, denoted by reference numeral 2400, includes a speed change mode operator 102, a controller 2404, a first motor driver 2407, a second motor driver 2406, first and second relays 2409 and 2408, and a motor 109.

The speed change mode operator 102 is provided to output a first speed change mode signal or a second speed change mode signal.

The speed change mode operator 102 may be provided at a portion of a handlebar of the electric bicycle 10.

The controller 2404 receives the first speed change mode signal or second speed change mode signal output from the speed change mode operator 102 and outputs a first control signal corresponding to the first speed change mode signal or a second control signal corresponding to the second speed change mode signal.

The controller 2404 may include an electronic controller unit (ECU) or a micro controller unit (MCU).

When the speed change mode operator 102 outputs a low-speed mode signal corresponding to the first speed change mode signal, the first motor driver 2407 receives the first control signal and outputs a first motor driving signal to drive the motor 109 in a low-speed mode corresponding to a first speed change mode. Also, when the speed change mode operator 102 outputs a high-speed mode signal corresponding to the second speed change mode signal, the second motor driver 2406 receives the second control signal and outputs a second motor driving signal to drive the motor 109, which is rotating with a driving force of the first motor driving signal, in a high-speed mode corresponding to a second speed change mode.

On the other hand, when the speed change mode operator 102 outputs the high-speed mode signal corresponding to the first speed change mode signal, the second motor driver 2406 receives the first control signal and outputs the first motor driving signal to drive the motor 109 in the high-speed mode corresponding to the first speed change mode. Also, when the speed change mode operator 102 outputs the low-speed mode signal corresponding to the second speed change mode signal, the first motor driver 2407 receives the second control signal and outputs the second motor driving signal to drive the motor 109, which is rotating with the driving force of the first motor driving signal, in the low-speed mode corresponding to the second speed change mode.

The first and second relays 2409 and 2408 selectively receive a relay switching enable signal from the controller 2404 so as to be turned on in response to the relay switching enable signal. Upon being turned on, the first and second relays 2409 and 2408 provide the first motor driving signal and the second motor driving signal to the motor 109.

As shown in FIGS. 24 to 32, the first relay 2409 provides the first motor driving signal output from the first motor driver 2407 to the motor 109, and the second relay 2408 provides the second motor driving signal output from the second motor driver 2406 to the motor 109.

The second relay 2408 may be electrically connected between an output stage of the second motor driver 2406 and an input stage of the motor 109.

As shown in FIG. 26 or 27, the second relay 2408 selectively receives a second relay switching enable signal of the relay switching enable signal so as to be turned on in response to the second relay switching enable signal. Upon being turned on, the second relay 2408 supplies the second motor driving signal to the motor 109.

The second relay 2408 has an internal circuit 2408a, which may include a first rectifying diode D1, a first switching device SW1, a first resistor R1, a second rectifying diode D2, a second switching device SW2, and a second resistor R2.

The first rectifying diode D1 may be electrically connected with one side of the controller 2404, and the first switching device SW1 may be electrically connected with the first rectifying diode D1 and the second motor driver 2406.

Here, the first switching device SW1 may include at least one of a metal-oxide semiconductor field effect transistor (MOSFET) and a bipolar junction transistor (BJT).

In this case, the first switching device SW1 may further include at least one Zener diode ZD5 which is electrically connected with the first resistor R1, and the second switching device SW2 to be described later, to cut off an abnormal signal from the motor 109.

The first resistor R1 may be electrically connected with the first rectifying diode D1, the first switching device SW1 and the second motor driver 2406, and the second rectifying diode D2 may be electrically connected with the other side of the controller 2404.

The second switching device SW2 may be electrically connected with the second rectifying diode D2, the first switching device SW1 and the motor 109, and the second resistor R2 may be electrically connected with the second rectifying diode D2, the second switching device SW2 and the motor 109.

Here, the second switching device SW2 may include at least one of a MOSFET and a BJT.

In this case, the second switching device SW2 may further include at least one Zener diode ZD6 which is electrically connected with the first switching device SW1 and the second resistor R2 to cut off an abnormal signal from the second motor driver 2406.

In the second relay 2408 with the above configuration, when the first and second switching devices SW1 and SW2 are turned on in response to the relay switching enable signal from the controller 2404, rectified through the first and second rectifying diodes D1 and D2, the level of the first motor driving signal or second motor driving signal supplied from the second motor driver 2406 is adjusted by the first resistor R1 and in turn by the second resistor R2, and the first motor driving signal or second motor driving signal of the adjusted level is then supplied to the motor 109.

Also, the internal circuit 2408a of the second relay 2408 may further include one or more Zener diodes ZD1 and ZD2 which are electrically connected with the second motor driver 2406 and the first resistor R1 to cut off an abnormal signal from the second motor driver 2406.

Also, the internal circuit 2408a of the second relay 2408 may further include one or more Zener diodes ZD3 and ZD4 which are electrically connected with the second resistor R2 and the motor 109 to cut off an abnormal signal from the motor 109.

Alternatively, as shown in FIG. 26 or 28, the second relay 2408 selectively receives the second relay switching enable signal of the relay switching enable signal so as to be turned on in response to the second relay switching enable signal. Upon being turned on, the second relay 2408 supplies the second motor driving signal to the motor 109.

The internal circuit 2408a of the second relay 2408 may include a third rectifying diode D3, a third switching device SW3, a third resistor R3, and a fourth switching device SW4.

The third rectifying diode D3 may be electrically connected with one side of the controller 2404, and the third switching device SW3 may be electrically connected with the third rectifying diode D3 and the second motor driver 2406.

Here, the third switching device SW3 may include at least one of a MOSFET and a BJT.

In this case, the third switching device SW3 may further include at least one Zener diode ZD9 which is electrically connected with the second motor driver 2406 and the third resistor R3 to cut off an abnormal signal from the motor 109.

The third resistor R3 may be electrically connected with the third rectifying diode D3 and the third switching device SW3, and the fourth switching device SW4 may be electrically connected with the third rectifying diode D3, the third resistor R3 and the motor 109.

Here, the fourth switching device SW4 may include at least one of a MOSFET and a BJT.

In this case, the fourth switching device SW4 may further include at least one Zener diode ZD10 which is electrically connected with the third resistor R3 and the motor 109 to cut off an abnormal signal from the second motor driver 2406.

Also, the internal circuit 2408a of the second relay 2408 may further include one or more Zener diodes ZD7 and ZD8 which are electrically connected with the third resistor R3, the third rectifying diode D3 and the fourth switching device SW4 to cut off an abnormal signal from at least one of the second motor driver 2406 and motor 109.

On the other hand, the first relay 2409 may be electrically connected between an output stage of the first motor driver 2407 and the input stage of the motor 109, as shown in FIGS. 29 to 32.

As shown in FIG. 30 or 31, the first relay 2409 selectively receives a first relay switching enable signal of the relay switching enable signal so as to be turned on in response to the first relay switching enable signal. Upon being turned on, the first relay 2409 supplies the first motor driving signal to the motor 109.

The first relay 2409 has an internal circuit 2409a, which may include a first rectifying diode D1, a first switching device SW1, a first resistor R1, a second rectifying diode D2, a second switching device SW2, and a second resistor R2.

The first rectifying diode D1 may be electrically connected with one side of the controller 2404, and the first switching device SW1 may be electrically connected with the first rectifying diode D1 and the first motor driver 2407.

Here, the first switching device SW1 may include at least one of a metal-oxide semiconductor field effect transistor (MOSFET) and a bipolar junction transistor (BJT).

In this case, the first switching device SW1 may further include at least one Zener diode ZD5 which is electrically connected with the first resistor R1, and the second switching device SW2 to be described later, to cut off an abnormal signal from the motor 109.

The first resistor R1 may be electrically connected with the first rectifying diode D1, the first switching device SW1 and the first motor driver 2407, and the second rectifying diode D2 may be electrically connected with the other side of the controller 2404.

The second switching device SW2 may be electrically connected with the second rectifying diode D2, the first switching device SW1 and the motor 109, and the second resistor R2 may be electrically connected with the second rectifying diode D2, the second switching device SW2 and the motor 109.

Here, the second switching device SW2 may include at least one of a MOSFET and a BJT.

In this case, the second switching device SW2 may further include at least one Zener diode ZD6 which is electrically connected with the first switching device SW1 and the second resistor R2 to cut off an abnormal signal from the first motor driver 2407.

In the first relay 2409 with the above configuration, when the first and second switching devices SW1 and SW2 are turned on in response to the relay switching enable signal from the controller 2404, rectified through the first and second rectifying diodes D1 and D2, the level of the first motor driving signal or first motor driving signal supplied from the first motor driver 2407 is adjusted by the first resistor R1 and in turn by the second resistor R2, and the first motor driving signal or first motor driving signal of the adjusted level is then supplied to the motor 109.

Also, the internal circuit 2409a of the first relay 2409 may further include one or more Zener diodes ZD1 and ZD2 which are electrically connected with the first motor driver 2407 and the first resistor R1 to cut off an abnormal signal from the first motor driver 2407.

Also, the internal circuit 2409a of the first relay 2409 may further include one or more Zener diodes ZD3 and ZD4 which are electrically connected with the second resistor R2 and the motor 109 to cut off an abnormal signal from the motor 109.

Alternatively, as shown in FIG. 30 or 32, the first relay 2409 selectively receives the first relay switching enable signal of the relay switching enable signal so as to be turned on in response to the first relay switching enable signal. Upon being turned on, the first relay 2409 supplies the first motor driving signal to the motor 109.

The internal circuit 2409a of the first relay 2409 may include a third rectifying diode D3, a third switching device SW3, a third resistor R3, and a fourth switching device SW4.

The third rectifying diode D3 may be electrically connected with one side of the controller 2404, and the third switching device SW3 may be electrically connected with the third rectifying diode D3 and the first motor driver 2407.

Here, the third switching device SW3 may include at least one of a MOSFET and a BJT.

In this case, the third switching device SW3 may further include at least one Zener diode ZD9 which is electrically connected with the first motor driver 2407 and the third resistor R3 to cut off an abnormal signal from the motor 109.

The third resistor R3 may be electrically connected with the third rectifying diode D3 and the third switching device SW3, and the fourth switching device SW4 may be electrically connected with the third rectifying diode D3, the third resistor R3 and the motor 109.

Here, the fourth switching device SW4 may include at least one of a MOSFET and a BJT.

In this case, the fourth switching device SW4 may further include at least one Zener diode ZD10 which is electrically connected with the third resistor R3 and the motor 109 to cut off an abnormal signal from the first motor driver 2407.

Also, the internal circuit 2409a of the first relay 2409 may further include one or more Zener diodes ZD7 and ZD8 which are electrically connected with the third resistor R3, the third rectifying diode D3 and the fourth switching device SW4 to cut off an abnormal signal from at least one of the first motor driver 2407 and motor 109.

As stated above, the electric bicycle driving apparatus 2400 according to the fifth embodiment of the present invention includes the speed change mode operator 102, the controller 2404, the first motor driver 2407, the second motor driver 2406, the first relay 2409, the second relay 2408, and the motor 109.

Therefore, in the electric bicycle driving apparatus 2400 according to the fifth embodiment of the present invention, when the first motor driving signal or second motor driving signal, output from the first motor driver 2407 or second motor driver 2406 for the speed change mode, is supplied to the motor 109, it may be possible to provide a faster switching response characteristic for a turn-on operation, thereby rapidly reducing a speed change mode time.

Further, in the electric bicycle driving apparatus 2400 according to the fifth embodiment of the present invention, when the first motor driving signal or second motor driving signal, output from the first motor driver 2407 or second motor driver 2406 for the speed change mode, is supplied to the motor 109, it may be possible to reduce heat generation to prevent malfunction.

Moreover, in the electric bicycle driving apparatus 2400 according to the fifth embodiment of the present invention, when the first motor driving signal or second motor driving signal, output from the first motor driver 2407 or second motor driver 2406 for the speed change mode, is supplied to the motor 109, the load to be driven is reduced, thereby reducing consumption of battery power.

In addition, in the electric bicycle driving apparatus 2400 according to the fifth embodiment of the present invention, the first relay 2409 and the second relay 2408 are employed. Therefore, when the first motor driving signal or second motor driving signal, output from the first motor driver 2407 or second motor driver 2406 for the speed change mode, is supplied to the motor 109, each of the first relay 2409 and second relay 2408 may provide a faster switching response characteristic for a turn-on operation, thereby more rapidly reducing a speed change mode time.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle driving apparatus comprising:
   a speed change mode operator to selectively output one of a first speed change mode signal and a second speed change mode signal;
   a controller to receive the first speed change mode signal or second speed change mode signal output from the speed change mode operator and output a first control signal corresponding to the first speed change mode signal or a second control signal corresponding to the second speed change mode signal;
   a motor driver to, when the speed change mode operator outputs the first speed change mode signal, receive the first control signal and output a first motor driving signal to drive a motor in a first speed change mode, and, when the speed change mode operator outputs the second speed change mode signal, receive the second control signal and output a second motor driving signal to drive the motor, the motor rotating with a driving force of the first motor driving signal, in a second speed change mode; and
   a relay to selectively receive a relay switching enable signal from the controller, the relay being turned on in response to the relay switching enable signal to provide at least one of the first motor driving signal and second motor driving signal to the motor,
   wherein the relay further includes at least one Zener Diode to cut off an abnormal signal from at least one of the motor driver and the motor.

2. The electric bicycle driving apparatus according to claim 1, wherein:
   the first speed change mode signal is a low-speed mode signal, and the first speed change mode is a low-speed mode; and
   the second speed change mode signal is a high-speed mode signal, and the second speed change mode is a high-speed mode.

3. The electric bicycle driving apparatus according to claim 1, wherein:
   the first speed change mode signal is a high-speed mode signal, and the first speed change mode is a high-speed mode; and
   the second speed change mode signal is a low-speed mode signal, and the second speed change mode is a low-speed mode.

4. The electric bicycle driving apparatus according to claim 1, wherein the relay is electrically connected between an output stage of the motor driver and an input stage of the motor.

5. The electric bicycle driving apparatus according to claim 1, wherein the relay comprises:
   a first relay to provide the first motor driving signal output from the motor driver to the motor: and
   a second relay to provide the second motor driving signal output from he motor driver to the motor,
   wherein the first relay and the second relay are electrically connected between an output stage of the motor driver and an input stage of the motor.

6. The electric bicycle driving apparatus according to claim 1, wherein the motor driver comprises:
   a first motor driver to output the first motor driving signal; and
   a second motor driver to output the second motor driving signal,
   wherein the relay is electrically connected between at least one of output stages of the first motor driver and second motor driver and an input stage of the motor.

7. The electric bicycle driving apparatus according to claim 1, wherein:
   the motor driver comprises:
   a first motor driver to output the first motor driving signal; and a second motor driver to output the second motor driving signal; and the relay comprises a first relay and a second relay, wherein the first relay is electrically connected between an output stage of the first motor driver and an input stage of the motor, and wherein the second relay is electrically connected between an output stage of the second motor driver and the input stage of the motor.

* * * * *